(12) United States Patent
Mirkin et al.

(10) Patent No.: US 12,558,725 B2
(45) Date of Patent: Feb. 24, 2026

(54) POLYMER-MEDIATED PARTICLE COARSENING WITHIN HOLLOW SILICA SHELL NANOREACTORS

(71) Applicant: NORTHWESTERN UNIVERSITY, Evanston, IL (US)

(72) Inventors: Chad A. Mirkin, Wilmette, IL (US); Vinayak P. Dravid, Evanston, IL (US); Liban Jibril, Evanston, IL (US)

(73) Assignee: NORTHWESTERN UNIVERSITY, Evanston, IL (US)

(*) Notice: Subject to any disclaimer, the term of this patent is extended or adjusted under 35 U.S.C. 154(b) by 395 days.

(21) Appl. No.: 18/118,031

(22) Filed: Mar. 6, 2023

(65) Prior Publication Data

US 2023/0286047 A1     Sep. 14, 2023

Related U.S. Application Data

(60) Provisional application No. 63/317,734, filed on Mar. 8, 2022.

(51) Int. Cl.
| | |
|---|---|
| *B22F 9/26* | (2006.01) |
| *B22F 1/054* | (2022.01) |
| *B22F 1/16* | (2022.01) |
| *B82Y 40/00* | (2011.01) |

(52) U.S. Cl.
CPC .............. *B22F 9/26* (2013.01); *B22F 1/054* (2022.01); *B22F 1/16* (2022.01); *B22F 2201/013* (2013.01); *B22F 2301/255* (2013.01); *B22F 2302/256* (2013.01); *B22F 2304/054* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 2010/0009001 A1* | 1/2010 | Armes ..................... | C09D 7/61 |
| | | | 424/490 |
| 2010/0015433 A1* | 1/2010 | Arfsten ................. | C23C 18/127 |
| | | | 524/401 |

(Continued)

OTHER PUBLICATIONS

Wang et al., Optical Properties and Applications of Plasmonic-Metal Nanoparticles, Adv. Funct. Mater., 30(51):(2020).

(Continued)

*Primary Examiner* — George Wyszomierski
(74) *Attorney, Agent, or Firm* — MARSHALL, GERSTEIN & BORUN LLP

(57)     ABSTRACT

A method of forming a nanoparticle can include admixing an aqueous solution into an oil-phase to thereby form an emulsion of droplets of the aqueous solution in the oil phase, the aqueous solution comprising a nanostructure precursor and a polymer, adding a silane precursor and catalyst to form a silica shell around each of the droplets to nanoreactors; annealing at a first temperature below the decomposition temperature of the polymer to aggregate the nanostructure precursor within the nanoreactor; and annealing at a second temperature above the decomposition temperature of the polymer to convert the aggregated nanostructure precursor to the nanostructure and decompose the polymer.

17 Claims, 27 Drawing Sheets

(56)                    References Cited

U.S. PATENT DOCUMENTS

2012/0064243 A1*    3/2012   Akay ......................... C08J 9/40
                                                        427/243
2015/0210868 A1    7/2015   Mirkin et al.

OTHER PUBLICATIONS

Wexler et al., Pyridine Coordination Chemistry of Nickel and Platinum Surfaces, J. Am. Chem. Soc., 104(7): 2034-2036 (Apr. 1, 1982).

Wu et al., Catalytic Nano-Rattle of Au@hollow Silica: Towards a Poison-Resistant Nanocatalyst, J. Mater. Chem., 21(3): 789-794 (2011).

Xue et al., Diffusion of Nanoparticles with Activated Hopping in Crowded Polymer Solutions, Nano Lett., 20(5): 3895-3904 (2020).

Yao et al., Synergetic Catalysis of Non-Noble Bimetallic Cu—Co Nanoparticles Embedded in SiO2 Nanospheres in Hydrolytic Dehydrogenation of Ammonia Borane, J. Phys. Chem. C, 119(25): 14167-14174 (2015).

Yoo et al., Cation-Controlled Catalysis with Crown Ether-Containing Transition Metal Complexes, Chem. Commun., 55(35): 5047-5059 (2019).

Zhang et al., Nonlinear Optical Properties of Metal Nanoparticles: A Review, RSC Adv., 7(71): 45129-45144 (2017).

Zhang et al., Reaction inside a Viral Protein Nanocage: Mineralization on a Nanoparticle Seed after Encapsulation via Self-Assembly, Nano Res., 10: 3285-3294 (2017).

Al-Bustami et al., Single Nanoparticle Magnetic Spin Memristor, Small, 14(30):e1801249(2018).

Aslam et al., Catalytic Conversion of Solar to Chemical Energy on Plasmonic Metal Nanostructures, Nature Catalysis, 1(1): 656-665 (2018).

Baldizzone et al., Confined-Space Alloying of Nanoparticles for the Synthesis of Efficient PtNi Fuel-Cell Catalysts, Angew. Chemie Int. Ed., 53(51): 14250-14254 (2014).

Behafarid et al., Towards the Understanding of Sintering Phenomena at the Nanoscale: Geometric and Environmental Effects, Top. Catal., 56: 1542-1559 (2013).

Chai et al., Scanning Probe Block Copolymer Lithography, Proc. Natl. Acad. Sci., 107 (47) :20202-20206(2010).

Chen et al., Hairy Uniform Permanently Ligated Hollow Nanoparticles with Precise Dimension Control and Tunable Optical Properties, J. Am. Chem. Soc., 139(37): 12956-12967 (2017).

Chen et al., Interface and Heterostructure Design in Polyelemental Nanoparticles, Science, 363(6430): 959-964 (2019).

Chen et al., Polyelemental Nanoparticle Libraries, Science, 352(6293): 1565-1569 (2016).

Chen et al., Tip-Directed Synthesis of Multimetallic Nanoparticles, J. Am. Chem. Soc., 137(28): 9167-9173 (2015).

Cros A., Charging Effects in X-Ray Photoelectron Spectroscopy, Journal of Electron Spectroscopy and Related Phenomena, 59(1): 1-14 (1992).

Dai et al., The Physical Chemistry and Materials Science behind Sinter-Resistant Catalysts, Chem. Soc. Rev., 47(12): 4314-4331 (2018).

Du et al., The Structural Fate of Individual Multicomponent Metal-Oxide Nanoparticles in Polymer Nanoreactors, Angew Chem Int Ed Engl., 56(26): 7625-7629 (2017).

Gandhi et al., Understanding the Magnetic Memory Effect in Fe-Doped NiO Nanoparticles for the Development of Spintronic Devices, ACS Appl. Nano Mater., 2: 278-290 (2019).

Gao et al., Rational Catalyst and Electrolyte Design for CO2 Electroreduction towards Multicarbon Products, Nature Catalysis, 2: 198-210 (2019).

Glasscott et al., Electrosynthesis of High-Entropy Metallic Glass Nanoparticles for Designer, Multi-Functional Electrocatalysis, Nat. Commun., 10(2650): 1-8(2019).

Hansen et al., Sintering of Catalytic Nanoparticles: Particle Migration or Ostwald Ripening?, Acc. Chem. Res., 46(8): 1720-1730 (2013).

He et al., Size-Dependent Dynamic Structures of Supported Gold Nanoparticles in CO Oxidation Reaction Condition, Proc. Natl. Acad. Sci., 115(30): 7700-7705 (2018).

Hoyt J. J., Phase Transformations, McMaster University Bookstore, (2011), Table of Contents.

Huang et al., Catalyst Design by Scanning Probe Block Copolymer Lithography, Proc. Natl. Acad. Sci., 115(15): 3764-3769 (2018).

Huang et al., Multimetallic High-Index Faceted Heterostructured Nanoparticles, J. Am. Chem. Soc., 142(10): 4570-4575 (2020).

Jiang et al., Bimetallic Au—Ni Nanoparticles Embedded in SiO2 Nanospheres: Synergetic Catalysis in Hydrolytic Dehydrogenation of Ammonia Borane, Chem., 16(10): 3132-3137 (2010).

Jibril et al., Massively Parallel Nanoparticle Synthesis in Anisotropic Nanoreactors, ACS Nano, 13(11): 12408-12414 (2019).

Jin et al., Palladium Concave Nanocubes with High-Index Facets and Their Enhanced Catalytic Properties, Angew. Chemie Int. Ed., 50(34): 7850-7854 (2011).

Khullar et al., How PEO-PPO-PEO Triblock Polymer Micelles Control the Synthesis of Gold Nanoparticles: Temperature and Hydrophobic Effects, Langmuir, 26(13): 11363-11371 (2010).

Kluender et al., Catalyst Discovery through Megalibraries of Nanomaterials, Proc. Natl. Acad. Sci., 116(1): 40-45 (2019).

Knetsch et al., Alcohols as Ligands: Part IV. Complexes of Ethylene Glycol with Some Metal(II) Sulfates and Nitrates, Recueil des Travaux Chimiques des Pays-Bas, 92(8): 855-864 (1973).

Laia et al., Light Scattering Study of Water-in-Oil AOT Microemulsions with Poly(Oxy)Ethylene, Langmuir, 16(2): 465-470 (2000).

Li et al., Denary Oxide Nanoparticles as Highly Stable Catalysts for Methane Combustion, Nat. Catal., 4: 62-70 (2021).

Li et al., Rapidly Constructing Multiple AuPt Nanoalloy Yolk@Shell Hollow Particles in Ordered Mesoporous Silica Microspheres for Highly Efficient Catalysis, ACS Sustain. Chem. Eng., 4(5): 2780-2788 (2016).

Lin et al., Formation of Hollow Silica Nanospheres by Reverse Microemulsion, Nanoscale, 7(21): 9614-9626 (2015).

Link et al., Spectral Properties and Relaxation Dynamics of Surface Plasmon Electronic Oscillations in Gold and Silver Nanodots and Nanorods, J. Phys. Chem. B, 103(40): 8410-8426 (1999).

Liu et al., Delineating the Pathways for the Site-Directed Synthesis of Individual Nanoparticles on Surfaces, Proc. Natl. Acad. Sci., 110(3): 887-891 (2013).

Liu et al., Metal Catalysts for Heterogeneous Catalysis: From Single Atoms to Nanoclusters and Nanoparticles, Chem. Rev., 118(10): 4981-5079 (2018).

Lohmuller et al., Nanopatterning by Block Copolymer Micelle Nanolithography and Bioinspired Applications, Biointerphases, 6(1): MR1-MR12 (2011).

Moulder et al., Handbook of X-Ray Photoelectron Spectroscopy: A Reference Book of Standard Spectra for Identification and Interpretation of XPS Data, Physical Electronics Division, Perkin-Elmer Corp., 254 pages (1992).

Mrudula et al., Structural Studies on Transition Metal Ion Complexes of Polyethylene Oxide-Natural Rubber Block Copolymers, Journal of Polymer Research, 26(191): 1-16 (2019).

Nagesetti et al., Multiferroic Coreshell Magnetoelectric Nanoparticles as NMR Sensitive Nanoprobes for Cancer Cell Detection, Sci. Reports, 7(1610): 1-9 (2017).

Pang et al., A General and Robust Strategy for the Synthesis of Nearly Monodisperse Colloidal Nanocrystals, Nat. Nanotechnol., 8(6): 426-431 (2013).

Roach et al., Counterion Binding in Aqueous Solutions of Poly(Vinylpyridines) as Assessed by Potentiometric Titration, Adv. Mater. Phys. Chem. 6(9): 249-261 (2016).

Shaik et al., A Generalized Method for the Synthesis of Ligand-Free M@SiO2 (M=Ag, Au, Pd, Pt) Yolk-Shell Nanoparticles, Langmuir, 33(13): 3281-3286 (2017).

Shan et al., Surface Oxygenation of Multicomponent Nanoparticles toward Active and Stable Oxidation Catalysts, Nat. Commun., 11(4201): 1-9 (2020).

(56)             References Cited

OTHER PUBLICATIONS

Shephard et al., Crystal Field Aspects of Vibrational Spectra: VII. Derivation of a Spectrochemical Series of Ligands from Infrared Spectra, Journal of Molecular Structure, 34(1): 83-91 (1976).

Shou et al., Effect of pH on the Single-Step Synthesis of Gold Nanoparticles Using PEO-PPO-PEO Triblock Copolymers in Aqueous Media, Journal of Colloid and Interface Science, 363(2): 481-489 (2011).

Steed et al., First- and Second-Sphere Coordination Chemistry of Alkali Metal Crown Ether Complexes, Coordination Chemistry Reviews, 215(1): 171-221 (2001).

Swisher et al., Nanoreactors for Particle Synthesis, Nat. Rev. Mater., 7:428-448 (2022).

Thanh et al., Mechanisms of Nucleation and Growth of Nanoparticles in Solution, Chem. Rev., 114(15): 7610-7630 (2014).

Tsukamoto et al., Atom-Hybridization for Synthesis of Polymetallic Clusters, Nat. Commun., 9(3873): 1-7 (2018).

Tsukamoto et al., Quantum Materials Exploration by Sequential Screening Technique of Heteroatomicity, J. Am. Chem. Soc., 142(45):19078-19084(2020).

Tuzovskaya et al., Structure and Electronic States of Gold Species in Mordenites, Chemical Physics, 338(1): 23-32 (2007).

Uflyand et al., Polymers Containing Metal Chelate Units. IV. Immobilised Complexes of Transition Metal Acrylates with 2,2'-Dipyridyl and 1, 10-Phenanthroline, Reactive Polymers, 11: 221-226 (1989).

* cited by examiner

A   PEO-Containing Nanoreactor Observed Products

B   Polymer-free Nanoreactor Observed Products

Polymer-free Shells, 12 h @ 200 °C, 12 h @ 800 °C

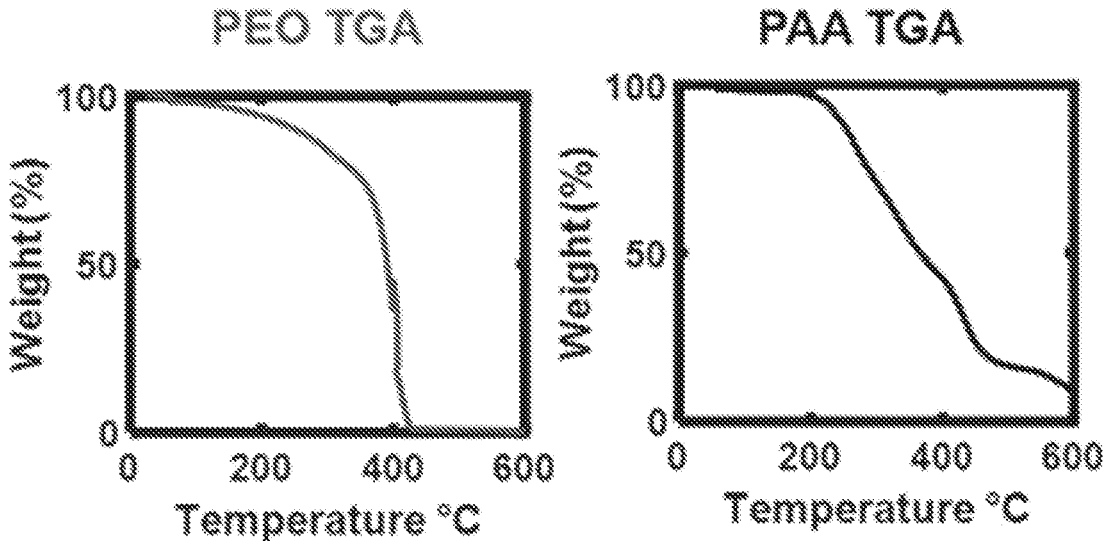
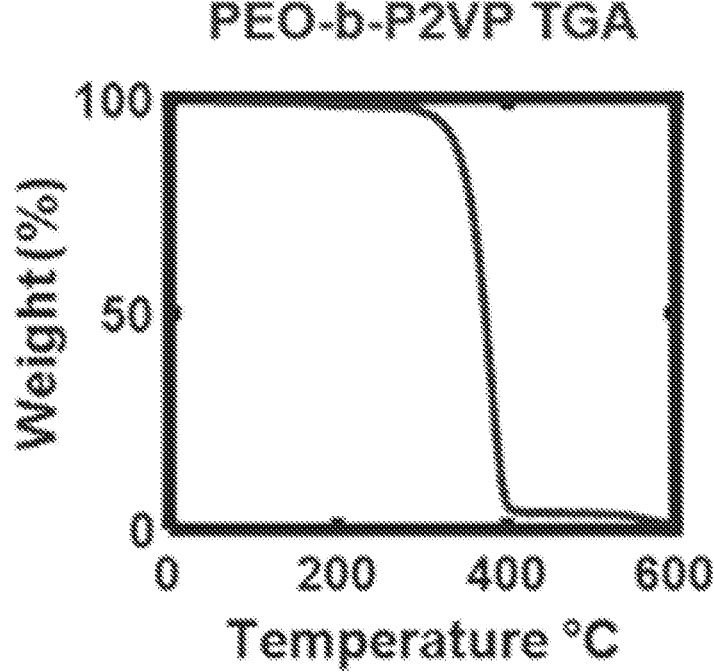
Figure 7B

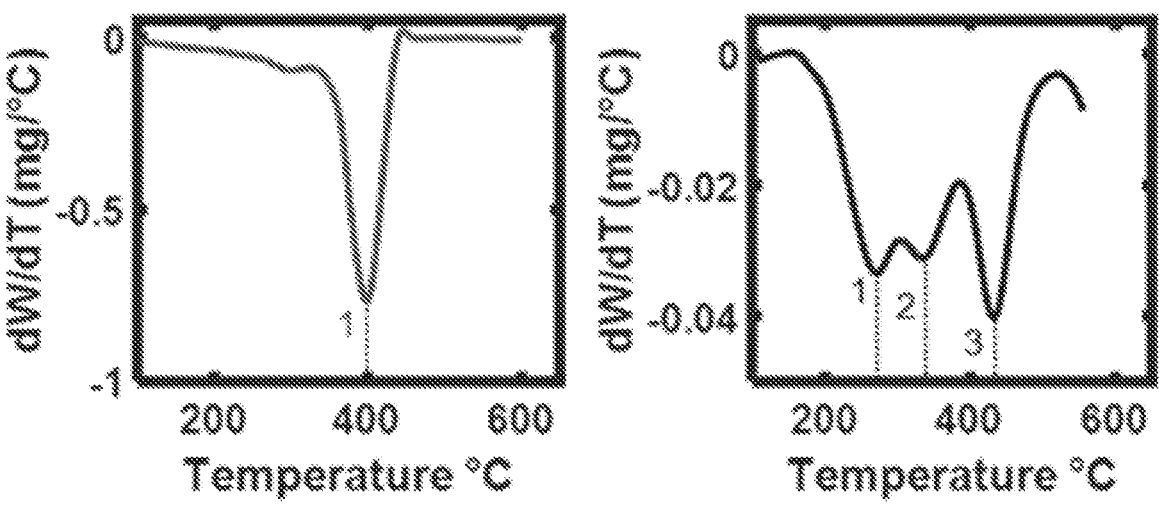
Peak 1: 400 °C
Peak 1: 270 °C
Peak 2: 335 °C
Peak 3: 430 °C
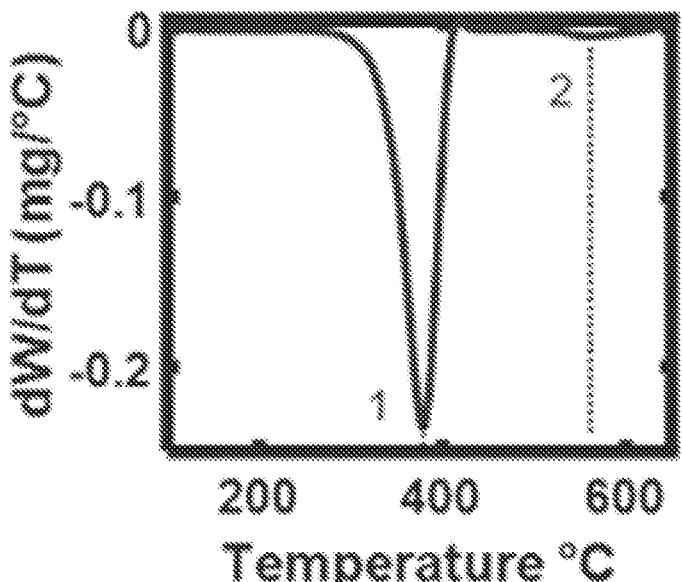
Peak 1: 380 °C
Peak 2: 560 °C
Figure 7C

A

Scheme of SiO₂ wafer with drop-casted precursor

Example wafer:
1: Au precursor only
2: Au PEO 2 mg/mL
3: Au PAA 2 mg/mL
4: Au BCP 2 mg/mL Au precursor only
Au PEO
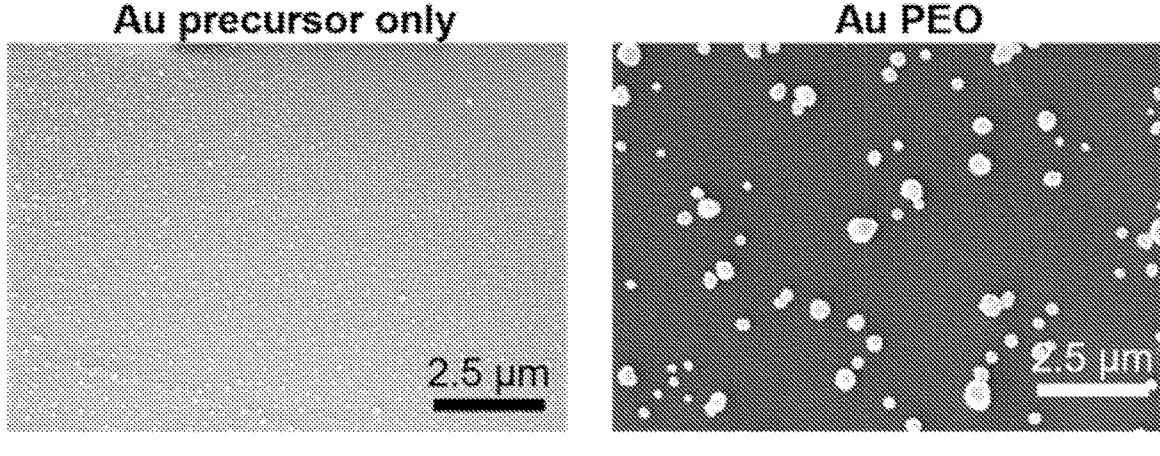
Figure 10B
Figure 10C
Au PAA
Au PEO-*b*-P2VP
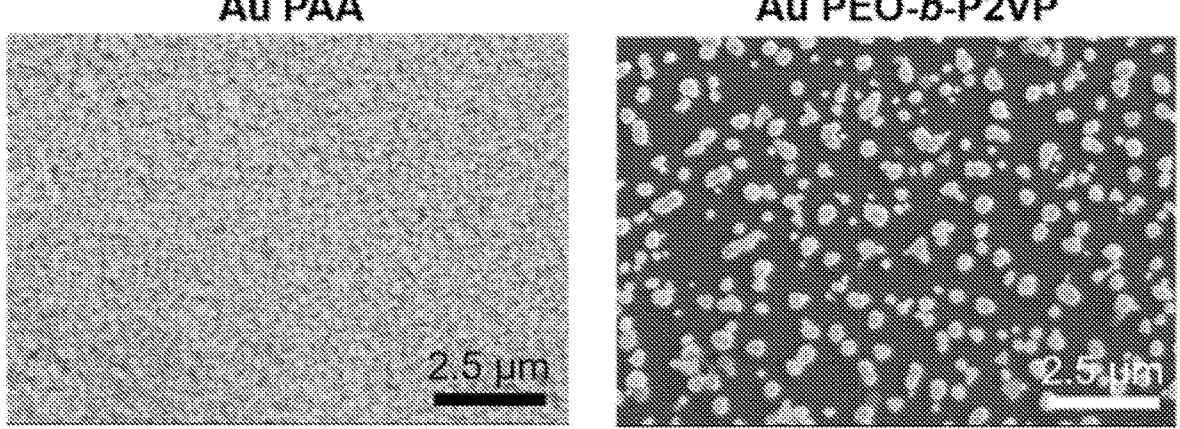
Figure 10D
Figure 10E

Au precursor only, 4 mg/mL

C.A.: 36 ± 2

Au PEO, 4:2 mg/mL

C.A.: 30 ± 2

Au PAA, 4:2 mg/mL

C.A.: 32 ± 1

Au BCP, 4:2 mg/mL

C.A.: 34 ± 2

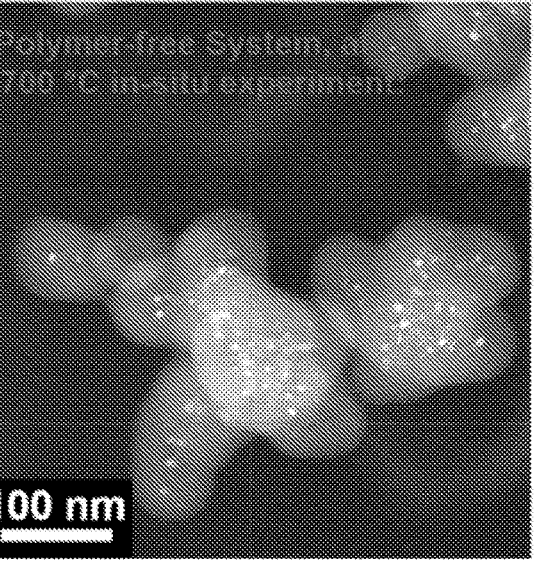
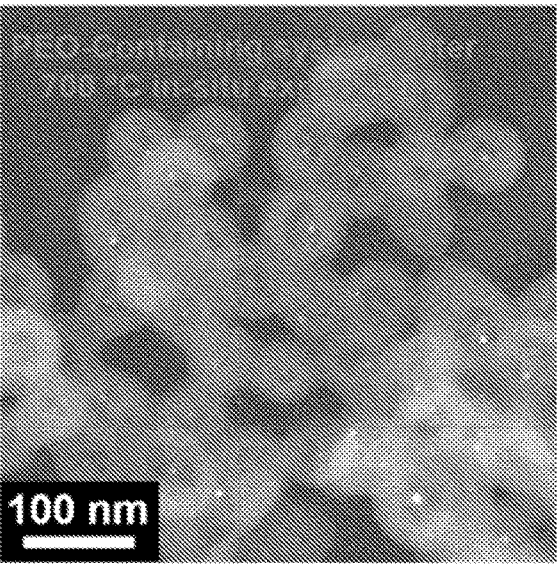
Figure 13A Figure 13B
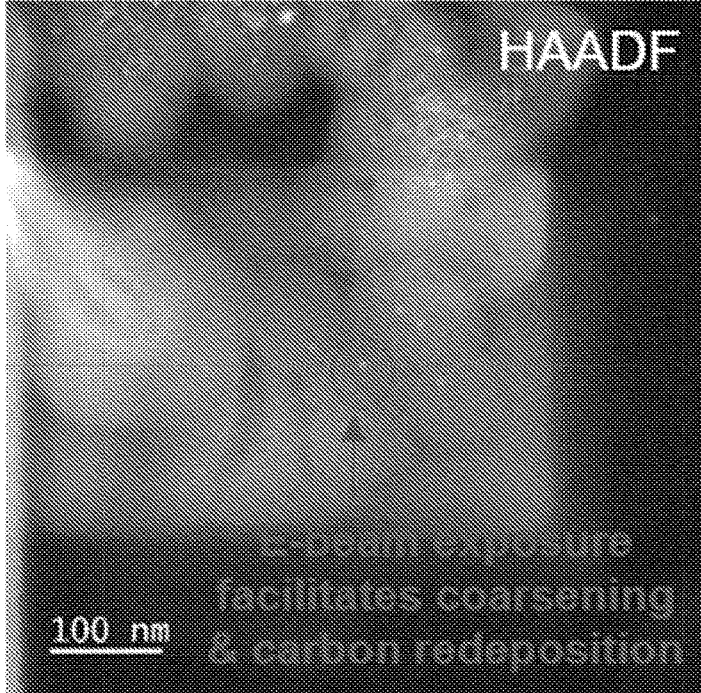
Figure 14

A

B

POLYMER-MEDIATED PARTICLE COARSENING WITHIN HOLLOW SILICA SHELL NANOREACTORS

CROSS-REFENCE TO RELATED APPLICATON

The benefit of priority to U.S. Provisional Patent Application No. 63/317,734 filed Mar. 8, 2022, is hereby claimed and the disclosure is incorporated herein by reference in its entirety.

STATEMENT OF GOVERNMENT INTEREST

This invention was made with government support under ECCS-1542205 awarded by the National Science Foundation, and FA9550-17-1-0348 awarded by the Air Force Office of Scientific Research. The government has certain rights in the invention.

FIELD

The disclosure relates to methods of forming nanoparticles in hollow-silica shell nanoreactors.

BACKGROUND

Methods are needed to rationally design and synthesize nanoparticle products with specific sizes, shapes, and compositions because these features dictate their electrical, optical, or chemical properties, and thus their performance in downstream applications. Nanoreactor-based strategies have emerged as a promising means to tune particle size, composition, and structure, in ways that exceed what is possible with traditional syntheses that depend on tailoring reduction kinetics and ligand chemistry. Nanoreactors operate by confining reactants within nanoscale volumes in order to deterministically drive complete conversion of reactants to particle products. For example, scanning probe block copolymer lithography (SPBCL)-generated polymeric domes on surfaces have been extensively used as reactors for the synthesis of a wide variety of particle types, and then screened for properties of interest. With this methodology, many independent attoliter polymeric domes each confine the reactants for the synthesis of a single particle positionally encoded on a substrate of interest. Up to seven element particles have been synthesized to date, and libraries with a million different structures (so called "megalibraries") have been generated in chip-based format and subsequently used as discovery tools. However, the scale-up of structures identified through such studies presents challenges.

A promising solution-based nanoreactor strategy that involves the large-scale generation of particles of interest relies on pre-loading metal salts into hollow silica shells followed by reductive nanoparticle growth. This methodology yields a high degree of particle size control (2-5 nm range), and the amorphous silica support material is stable at high temperatures ($T_m \approx 2000$ K), which prevents excessive particle sintering. However, at present, it is difficult to synthesize particles of uniform size and composition (with respect to the numbers and types of elements). Indeed, processing conditions that favor particle coarsening often result in particle escape and sintering outside of the reactor, while conditions that do not favor coarsening result in polydisperse mixtures of particles that reflect the random fluctuations in their local chemical environments during synthesis.

SUMMARY

A method of forming nanostructures can include admixing an aqueous solution into an oil-phase to thereby form an emulsion of droplets of the aqueous solution in the oil phase, the aqueous solution comprising a nanostructure precursor and a polymer; adding a silane precursor and catalyst to the emulsion under conditions sufficient to form a silica shell around each of the droplets to thereby form nanoreactors comprised of a hollow silica shell surrounding a core comprising the aqueous solution; annealing at a first temperature below the decomposition temperature of the polymer to aggregate the nanostructure precursor within each of the nanoreactors; and annealing at a second temperature above the decomposition temperature of the polymer to convert the aggregated nanostructure precursor to the nanostructure and decompose the polymer thereby forming a nanostructure within the hollow silica shell.

BRIEF DESCRIPTION OF THE DRAWINGS

FIGS. 2A to 2E show a characterization of the Au metal salt-PEO ink incorporated within hollow silica shells (HSS); wherein FIG. 2A is a SEM image of the external surfaces of the silica shells, FIG. 2B shows i) a STEM image and ii) elemental map of gold particles isolated within silica shells, FIG. 2 is XRD data and literature powder diffraction pattern showing the presence of FCC gold in the annealed samples, FIG. 2D is UV-vis data showing the emergence of the LSPR band that is characteristic of Au nanoparticles. The inset shows a photograph of a small vial containing the collected products after reductive annealing, and FIG. 2E is XPS data of the unannealed and annealed samples, showing a clear decrease in the oxidation state of the Au 4f electrons after reductive annealing. The dotted lines represent peak deconvolution into contributions from oxidized gold (higher binding energy) and reduced gold (lower binding energy); indicating the presence of zero-valent Au in the final product.

FIG. 3B includes histograms showing the number of nanoparticles per nanoreactor for each polymer type, and the yield of individual, single nanoparticles in each case. FIG. 3C includes histograms of the nanoparticle sizes and associated dispersity as a function of polymer presence and type. The dotted lines represent the fit with a normal distribution. The sizes are: no polymer: 3.1±1.7 nm, PEO: 5.7±0.7 nm, PAA: 4.0±1.3, and PEO-b-P2VP: 3.6±0.9 nm.

FIG. 4B is a graph showing nanoparticle relative diameter (divided by average shell size in each case), and FIG. 4C is a graph showing nanoparticles per nanoreactor as a function of annealing temperature for polymer-free and PEO-containing nanoreactors. A separate region is imaged at 700° C. to examine the effect of e-beam exposure (which is qualitatively large with the polymer-free system.

FIGS. 5A and 5B are schematics of the observed products with (FIG. 5A) and without (FIG. 5B) polymer. At low temperatures, nucleation bursts occur, and metal salts are reduced to zero-valent atoms. At intermediate temperatures, PEO-containing shells support complete coarsening into large single nanoparticles, while polymer-free shells retain multiple particles. At excessively high temperatures, global coarsening is promoted, and the particles escape the shells to grow un-templated or enter adjacent shells (regardless of polymer incorporation).

FIG. 7B is a thermogravimetric analysis showing weight vs. temperature for the three tested polymers.

FIG. 7C are graphs of derivatives of the TGA data show peaks in weight loss at certain temperatures for each polymer.

FIGS. 9A and 9B are graphs showing temperature programmed reduction for metal salt precursor $HAuCl_4 \times 3$ $H_2O$, and the metal salt mixed with PEO, wherein FIG. 9A shows mass spectrometry of the effluent stream from the gold salt alone during reductive annealing in $H_2$. Two $H_2$ absorption peaks are observed, which broadly overlap with HCl production, with maxima at T=170° C. and 310° C.; and FIG. 9B shows mass spectrometry of the effluent during $H_2$ reduction of HAuCla mixed with PEO in the same mass ratio (2:1) as within the silica shells. One collective peak is observed at T=165° C., overlapping with that of HCl production. Carbon peaks due to the decomposition of the polymer are monitored with the $CO_2$ and formaldehyde produced.

FIGS. 10B to 10E are images of nanoparticle coated wafers, with FIG. 10B showing polymer-free inks, FIG. 10C showing PEO-containing ins, FIG. 10D showing PAA-containing inks, and FIG. 10E showing PEO-b-P2VP-containing inks were used to prepare these nanoparticle-coated wafers. All inks contained polymer at 2 mg/mL and metal salt at 4 mg/mL. The particle diameters were calculated based on higher magnification images.

FIGS. 13A and 13B shows HAADF STEM images taken after in situ ramping to 700° C. and holding for 30 mins in a non-e-beam-exposed reference region. FIG. 13A shows that without e-beam exposure, the coarsening conditions are not sufficient to drive large single nanoparticle growth within individual shells without polymer incorporation, due to the shorter annealing times. FIG. 13B shows that regardless of e-beam exposure, the PEO-containing system yields large single nanoparticles at 700° C.

FIG. 14 shows HAADF STEM images taken at 60° C. during initial stages of the in-situ experiment resulting in significant carbon redeposition as well as gold particle coarsening (clear when compared with the unexposed region). Continuous e-beam examination at high magnification (approximately 1 M x, 15 μA emission current, 200 kV acceleration voltage) appears to significantly challenge the ability to produce results similar to those seen for ex situ experiments.

FIGS. 15A and 15B shows ex situ samples taken with extremely brief annealing times (1 h at maximum temperature) for comparison to in situ data, wherein FIG. 15A shows polymer-containing nanoparticles are larger at every temperature range, indicating that polymer fosters the coarsening process starting at low temperatures, and FIG. 15B shows the number of nanoparticles per nanoreactor varies significantly in the polymer-free system, while the polymer-containing system quickly produces single particles (although many multi-particle shells remain with these brief annealing times).

DETAILED DESCRIPTION

A method of forming nanostructures in accordance with the disclosure can include admixing an aqueous solution into an oil-phase to thereby form an emulsion of droplets of the aqueous solution in the oil phase, the aqueous solution comprising a nanostructure precursor and a polymer; adding a silane precursor and catalyst to the emulsion under conditions sufficient to form a silica shell around each of the droplets to thereby form nanoreactors comprised of a hollow silica shell surrounding a core comprising the aqueous solution; annealing at a first temperature below the decomposition temperature of the polymer to aggregate the nanostructure precursor within each of the nanoreactors; and annealing at a second temperature above the decomposition temperature of the polymer to convert the aggregated nanostructure precursor to the nanostructure and decompose the polymer thereby forming a nanostructure within the hollow silica shell. The annealing can be performed, for example, in a reductive environment. For example, the reductive environment can be established with a flow of $H_2$ gas.

Figure 1:
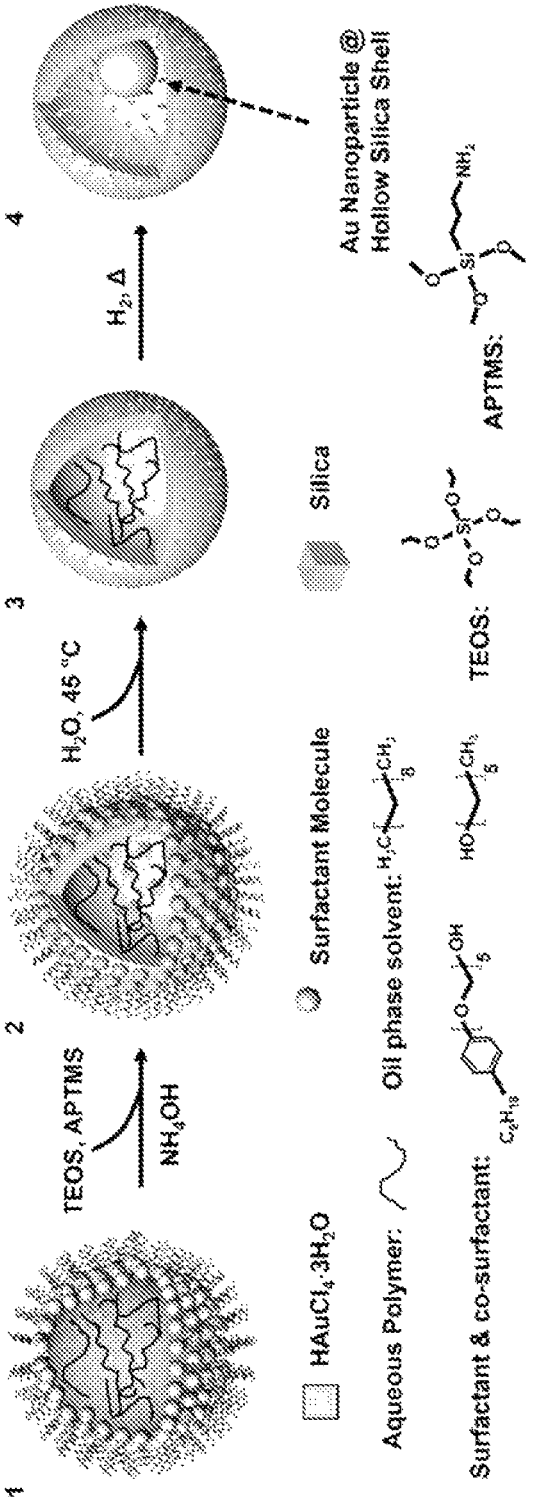
FIG. 1 is a schematic illustration of a method of the disclosure.

Referring to FIG. 1, a method in accordance with the disclosure for forming a nanostructure within silica hollow shell nanoreactors is schematically illustrated. The method includes dispersing an aqueous solution comprising a nanostructure precursor and a polymer dissolved in water in an oil-phase to form water-in-oil microemulsion droplets loaded with the metal salt and aqueous polymer. A silane precursors is then added to the droplets to form a silica shell surrounding the droplets, thereby forming the hollow silica shell nanoreactors. The hollow silica shells containing the nanostructure precursor and aqueous polymer can then subject to reductive thermal annealing to form single metal nanoparticles within each hollow silica shell.

The nanostructures can be used as produced surrounded by the hollow silica shell. The silica shell is porous and allows gas and small molecules to pass there-through to interact with the nanostructure contained within. The presence of the silica shell can be beneficial for preventing sintering (particle agglomeration) after synthesis. However, if desired, the silica shell can be removed by etching with a basic solution, such as KOH or HF.

For example, in the scheme of FIG. 1, four stages are shown 1) Metal salt and polymer molecules dissolved in water are dispersed in an oil-phase solvent stabilized by two surfactants. 2) Silane precursors are introduced, with a base catalyst to commence silica shell formation. 3) Warm water is used to remove surfactants and residual uncondensed silica. 4) Reductive thermal annealing is carried out in two stages in a tube furnace to promote the formation of single metal nanoparticles.

It has advantageously been found that polymer incorporation into the nanostructure precursor containing droplets provides control over particle coarsening within the hollow silica shell nanoreactors. Without the presence of the polymer within the nanoreactor, the precursors were observed not to convert into single particle products and resulted in incomplete confinement and particle escape. Methods of the disclosure, which utilize the polymer within the silica nanoreactor can provide enhanced coarsening. Without intending to be bound by theory, it is believed that the enhanced diffusion through the polymer matrix drives particle coarsening.

The droplets can be formed by introducing the solution containing the nanostructure precursor and polymer into a vigorously stirred solution of an oil-phase solvent. The oil-phase can be stabilized by one or more surfactants. For example, the solvent can be n-decane and can be stabilized by two surfactants, Igepal CO-520 and n-hexanol. Other suitable solvents can include cyclohexane, n-hexane, n-heptane, n-octane, n-nonane, n-decane, n-undecane, n-dodecane, and combinations thereof. A large molar volume solvent such as n-decane, as opposed to a cyclohexane microemulsion, can be useful as this can increase the equilibrium aqueous phase droplet diameter. This facilitates simpler characterization through electron microscopy of the resultant particles, but also increases the difficulty of achieving complete coarsening given the larger dimensions of the nanoreactor. Methods of the disclosure can provide improved uniformity of single particle products within the nanoreactor. For example, the yield of single particles within each nanoreactor can be at least about 70%. This is a significant improvement over systems in which no polymer is used in the nanoreactor.

The surfactant can be a nonionic surfactant with hydrophile-lipophile balance near 10. The surfactant can be, for example, one or more of Igepal CO-520, n-hexanol, Igepal CA-630, CO-630, CA-720, or Tergitol, pentanol, n-butanol, tert-butyl alcohol, tert-amyl alcohol, or other small molecule anionic surfactant such as sodium dodecylbenzene sulfonate (SDBS), and cetyl trimethyl ammonium bromide (CTAB).

The nanostructure precursor can be, for example, any precursor material suitable for forming a metal nanostructure, a semiconductor nanostructure, or a dielectric nanostructure. For example, the nanostructure precursor can be a metal salt, such as one or more of $HAuCl_4$, $AgNO_3$, $H_2PtCl_6$, $Na_2PdCl_4$, $Fe(NO_3)_3$, $Co(NO_3)_2$, $Ni(NO_3)_2$, $Cu(NO_3)_2$, $Na_2PtCl_4$, $CdCl_2$, $ZnCl_2$, $FeCl_3$, $NiCl_2$, and combinations thereof. For example, a metal alloy structure can be formed by blending, mixing, or otherwise combining two more metal precursors in the solution.

Generally, the polymer is a small molecular weight (e.g., <5000 g/mol) hydrophilic polymer. The polymer can be, for example, polyethylene oxide (PEO), PEO-b-P2VP, PAA, Poly(vinyl alcohol), polyethyleneimine, poly(sodium 4-styrenesulfonate), Poly(diallyldimethylammonium chloride). PEO has been found to facilitate particle diffusion, and is relatively residue-free after thermal annealing (>99% mass loss above 500° C., FIG. 7B, 7C), leaving the metal particle surface clean for further use. The polymer can be selected such that it promotes metal atom diffusion while not adversely affecting the structure of the microemulsion.

The silane precursor can be one or more of tetraethyl orthosilicate (TEOS), (3-aminopropyl)trimethoxysilane (APTMS), tetramethyl orthosilicate, aminopropyl)triethoxysilane (APTES), or other silanes with 3 methoxy/ethoxy groups and a longer carbon (ideally ending with an amine), such as 3-(2-Aminoethylamino) propyldimethoxymethylsilane, n-(6-aminohexyl) aminopropyltrimethoxysilane, 95%, n-methylaminopropyltrimethoxysilane, n-butylaminopropyltrimethoxysilane, and n-(2-aminoethyl)-3-aminopropyltriethoxysilane, 92%.

The silane precursor can be introduced with a basic catalyst. For example, the basic catalyst can be ammonium hydroxide, potassium hydroxide, and/or sodium hydroxide.

The silane precursor can be stirred with the droplets for a time sufficient to form a silica shell surrounding the droplets. For example, the silica precursor can be stirred with the droplets for about 1 to 3 days or more depending on the precursor utilized and the time necessary to form the silica shell.

After the silica shell has been formed, the shells can be washed to remove residual surfactant, organic molecules, and residual silica. For example, washed twice via centrifugation to remove residual surfactant, organic molecules, and residual silica within the cores.

Figure 7A:
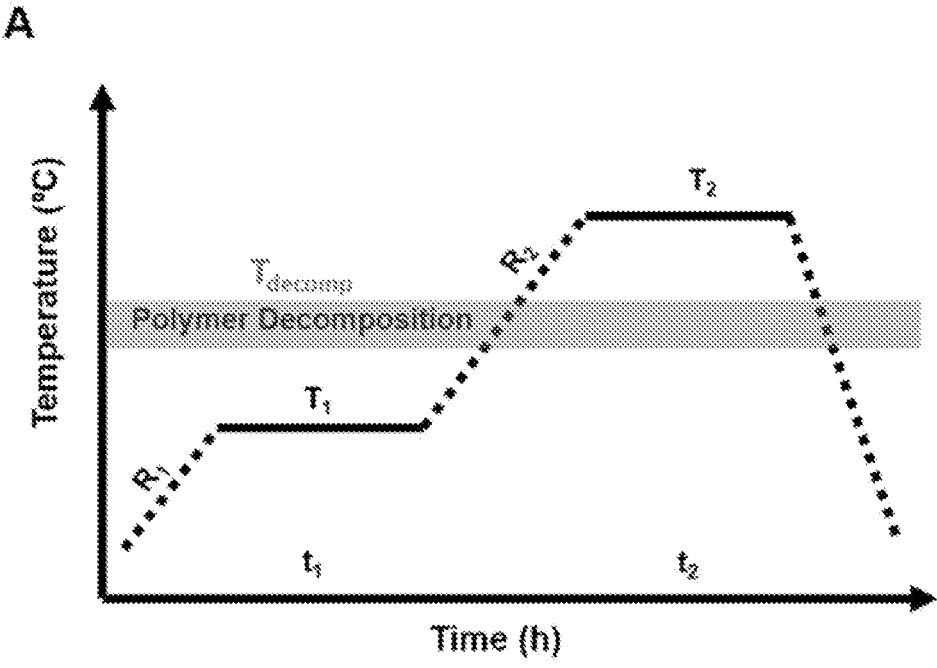
FIG. 7A is a graph showing a two-step reductive annealing profile for nanoparticle growth within hollow silica shells.

The two-stage annealing is performed in a reductive $H_2$ environment. The annealing can be performed at a first temperature, below the decomposition temperature of the polymer and then increased to a second temperature above the decomposition temperature of the polymer (FIG. 7A). Annealing at the first temperature facilitates nanoparticle nucleation and growth within the hollow silica shell, while the annealing at the second, higher temperature step facilitates further structural evolution. This is analogous to that seen in the SPBCL-based system, such as described in U.S. Patent Application Publication No. 2015/0210868.

For example, depending on the polymer selected, the first temperature $T_1$ can be in a range of about 70° C. to about 400° C., about 78° C. to about 400° C., about 80° C. to about 350° C., about 100° C. to about 300° C. about 120° C. to about 250° C., about 140° C. to about 225° C., about 150° C. to about 200° C., about 70° C. to about 78° C., about 76° C. to about 80° C., or about 78° C. to about 200° C. Other suitable temperatures include for example, about 70, 72, 74, 76, 78, 80, 82, 84, 86, 88, 90, 92, 94, 96, 98, 100, 110, 120,

US 12,558,725 B2

7

130, 140, 150, 160, 170, 180, 190, 200, 210, 220, 240, 250,
260, 270, 280, 290, 300, 310, 320, 330, 340, 350, 360, 370,
380, 390, or 400° C.

For example, depending on the polymer selected, the
second temperature $T_2$ can be in a range of about 400° C. to
about 800° C., about 450° C. to about 750° C., about 500°
C. to about 700° C., about 550° C. to about 650° C. For
example, the temperature can be about 400, 410, 420, 430,
440, 450, 460, 470, 480, 490, 500, 510, 520, 530, 540, 550,
560, 570, 580, 590, 600, 610, 620, 630, 640, 650, 660, 670,
680, 690, 700, 710, 720, 730, 740, 750, 760, 770, 780, 790,
and 800° C.

Figure 9A:
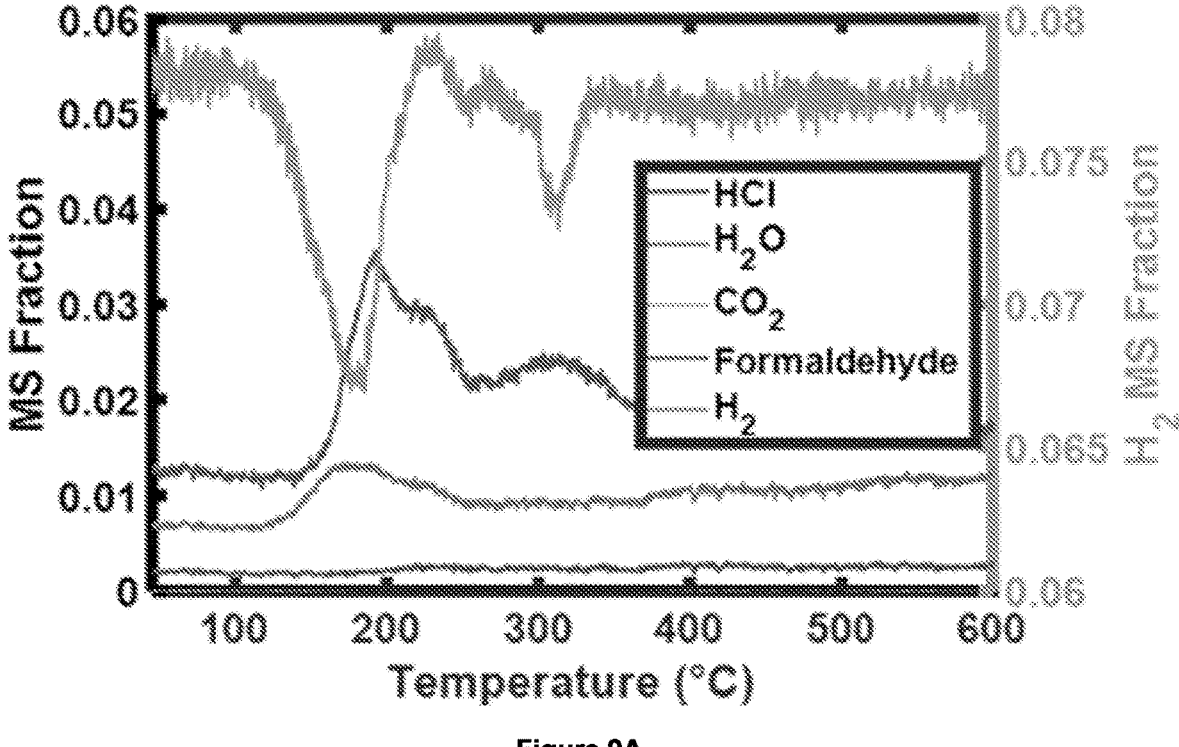
Figure 9B:
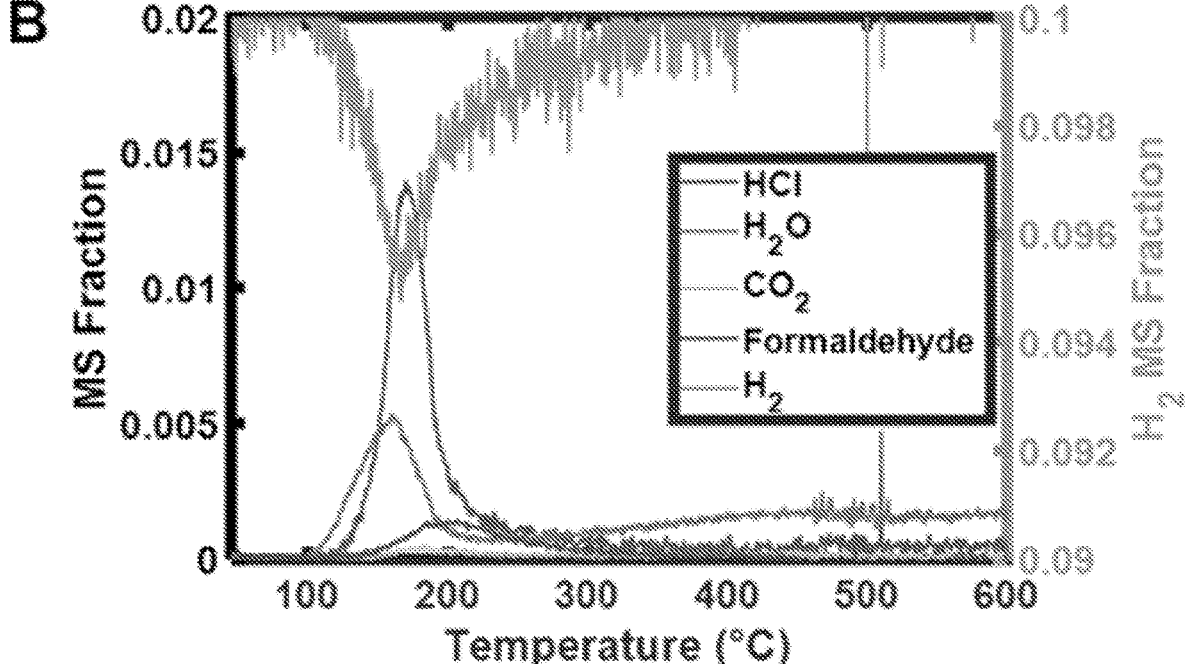

The role of polymer chemistry on nanoreactor single
particle yield can be understood based on three general
factors: the reduction dynamics of the metal salt, the mobil-
ity of the metal ions and atoms in the polymer, and the effect
of the polymers on the structure of the microemulsion
droplets. Given the weakly coordinating nature of the ether
subunits within the PEO polymer, it was hypothesized that
the dynamics of the transition from metal salt to reduced
metal atoms that occurs within the hollow shell system may
be modified when the polymer is present. To test this
hypothesis, temperature programmed reduction was applied
to monitor the uptake of $H_2$ of the metal salt $HAuCl_4 \times 3\ H_2O$
in the absence and presence of PEO. When PEO is not
incorporated, two large $H_2$ consumption peaks were
observed, as well as HCl evolution, which was associated
with the reduction of the metal salt (FIG. 9). This process
occurs in the range of approximately 120° C. to 350° C., and
the two-step reduction process in this temperature range has
been previously attributed to two-stage reduction from $Au^{3+}$
to $Au^+$ and then from $Au^+$ to $Au^0$. However, the difference in
the $H_2$ consumed and HCl produced between the two peaks
implies that some quantity of gold salt may be fully reduced
in the first stage. In contrast, when PEO is incorporated in
the same mass ratio as utilized in the hollow shell experi-
ments, one slightly broader collective $H_2$ consumption peak
was observed, which strongly overlaps with the HCl pro-
duction peak, occurring at 165° C. Based on this evidence,
it appears that the polymer serves as a weak reducing agent,
which is in agreement with past reports, and leads to
completion of the reduction process at a lower temperature
(~250° C. vs. 350° C.). Based on this evidence, it is believed
that within the silica shells, despite using the same thermal
treatment, polymer incorporation may accelerate the reduc-
tion process and therefore jump-start the nucleation and
growth of reduced metal atoms.

The effect of the structure of the microemulsion droplets,
as dictated by the choice of polymer, also plays a role on
particle formation. This structure is particularly relevant in
the case of PEO-b-P2VP, as expected, but a high yield of
single particles was not observed based on the polymer's
high mobility. However, while the 2VP units on PEO-b-2VP
are initially approximately 30% protonated (at pH 4), the
base catalyst added to initiate silane condensation may lead
to further deprotonation, rendering the polymer hydropho-
bic. As a result, the polymer may be acting as a pore-
templating agent, allowing metal to escape during, or even
after, shell formation. In addition, PEO-b-P2VP has a larger
molecular weight than PEO (2.8 k g/mol vs. 1.1 k g/mol),
and so templates the formation of larger shells (see Table
below), and therefore larger pore sizes, which may also
facilitate metal escape.

8

| Ink Type | Single Nanoparticle Yield (%) | Unencapsulated Particles/ 100 shells | Average Particle Diameter (nm) | Average Shell Size (nm) |
|---|---|---|---|---|
| No Polymer | 6% | 0.02 | 3.1 ± 1.7 nm | 36 ± 7 nm |
| PEO | 76% | 0.03 | 5.7 ± 0.7 nm | 40 ± 6 nm |
| PAA | 54% | 0.04 | 4.0 ± 1.3 nm | 45 ± 5 nm |
| PEO-b-P2VP | 50% | 0.10 | 3.6 ± 0.9 nm | 46 ± 6 nm |

This explanation is consistent with the observation that, in
the PEO-b-P2VP case, a significant number of unencapsu-
lated particles were observed (three times more than when
PEO was used). The low yield of single particles in the case
of PEO-b-2VP is largely therefore a result of the significant
number of empty shells (approximately 40%), rather than a
result of the observation of multi-particle shells as seen in
the polymer-free case. Thus, appropriate polymer selection
in this context implies the need to balance metal escape with
an improved metal atom mobility.

Figure 4A:
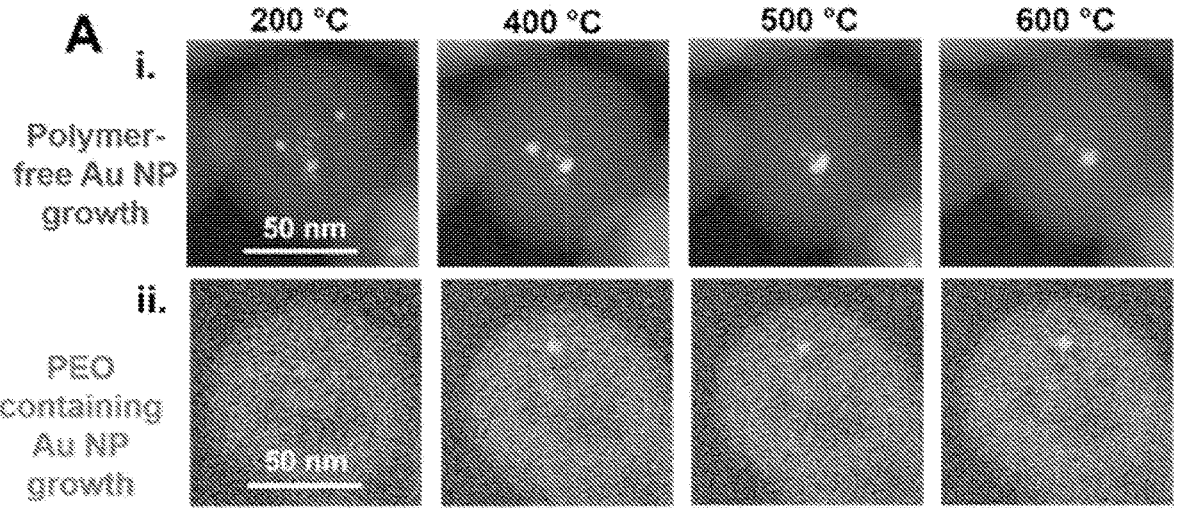
FIGS. 4A to 4C shows in situ monitoring of gold nanoparticle growth in a reductive $H_2$ environment, wherein FIG. 4A includes HAADF STEM images monitoring i. polymer-free nanoparticle growth, and ii. PEO-based nanoparticle growth in a specific region as a function of temperature. A decreased e-beam dose was utilized with the PEO-containing system to prevent excessive e-beam-induced sintering and carbon redeposition (120 vs. 800 e/Å$^2$)
Figure 4B:
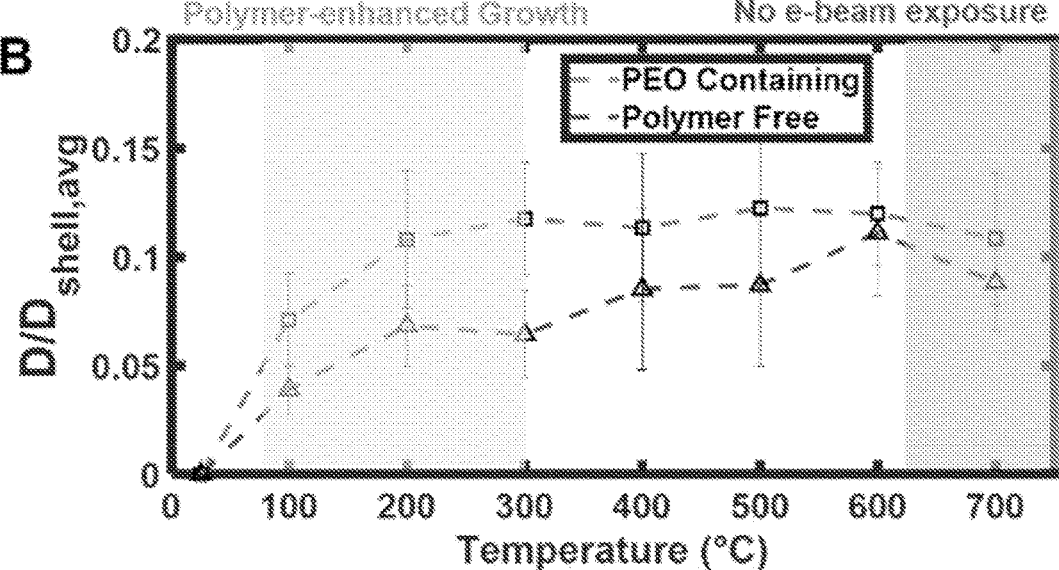
Figure 4C:
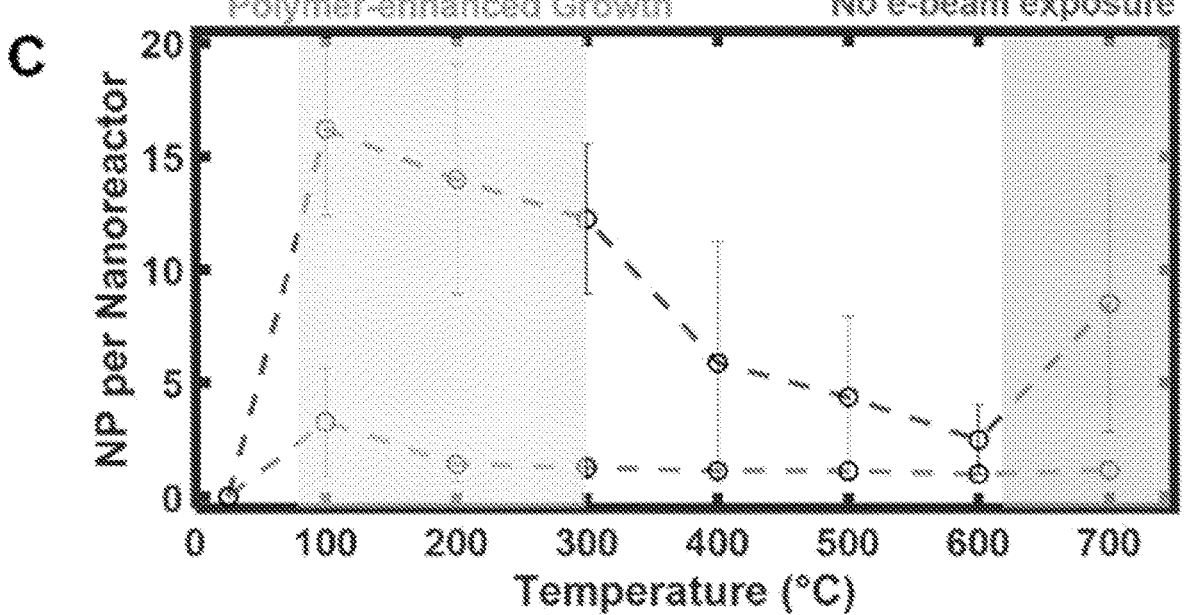
Figure 6:
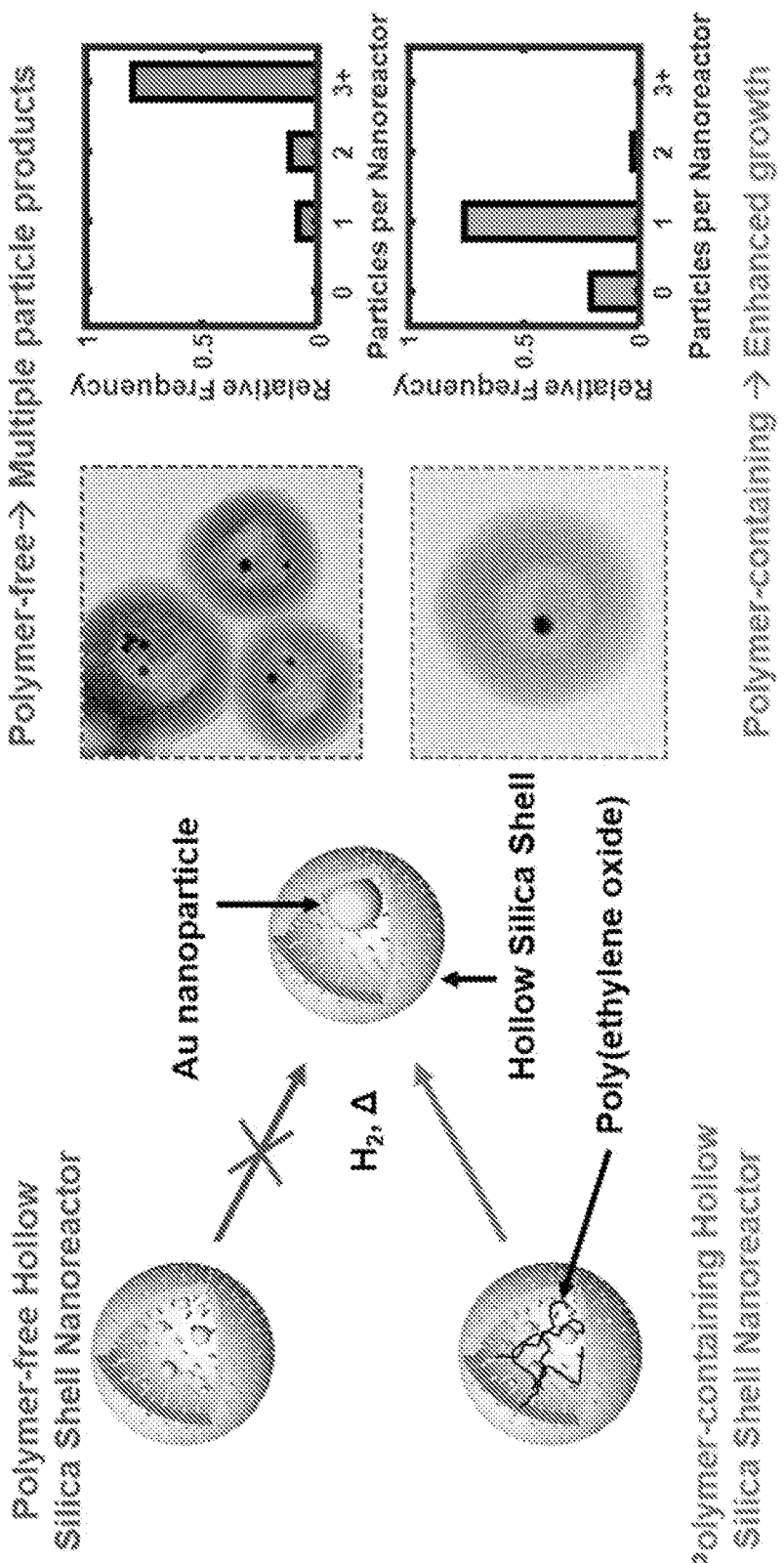
FIG. 6 show a comparison of polymer mediated growth in accordance with the disclosure and polymer-free growth.

Finally, if polymer-mediated metal nanoparticle growth is
facilitated by increased diffusion, coarsening should mainly
be observed at temperatures below the polymer decompo-
sition temperature. In situ scanning/transmission electron
microscopy was performed at discrete temperature steps to
determine the effect of annealing temperature on particle
coarsening. The in-situ STEM experiments were conducted
in a 10% $H_2$ environment (90% Ar) at atmospheric pressure
using a commercial sealable gas chip and a TEM holder,
which mitigates metal evaporation and creates a reducing
atmosphere isolated from the high-vacuum environment
within the TEM column. In these experiments, silica nan-
oreactors with metal salts in the absence or presence of PEO
were monitored during reductive annealing. The PEO-con-
taining shells were imaged with a lower e-beam dose (120
$e/Å^2$ vs. 800 $e/Å^2$) than the polymer-free shells due to
e-beam-induced carbon redeposition. After the initial nucle-
ation burst, most particle coarsening occurs by 400° C. (the
degradation temperature of the polymer) when PEO is used,
and coarsening continues at higher temperatures in the
polymer-free case (FIG. 4A). Furthermore, the particle
growth rate is significantly larger when PEO is used, espe-
cially at temperatures below 400° C., and a larger average
particle size persists thereafter (FIG. 4B). Similarly, after the
initial nucleation-burst event where the number of particles
per reactor spikes (FIG. 4C), the number of particles dras-
tically decreases and reaches a minimum very rapidly
(1.3±0.5 NPs/nanoreactor at T=300° C.). As the temperature
is increased above approximately 300° C., the number of
particles per reactor and particle diameters do not change
significantly, defining a polymer-enhanced growth region. In
order to control for e-beam-induced coarsening, the process
was monitored after reaction completion at a temperature of
700° C. (FIG. 4, FIG. 13). The slight decrease in average
particle size and increase in particles per reactor observed
implies a small, but not insignificant, degree of e-beam-
induced coarsening, which is more pronounced in the poly-
mer-free case (FIG. 14).

Figures 15A, 15B:
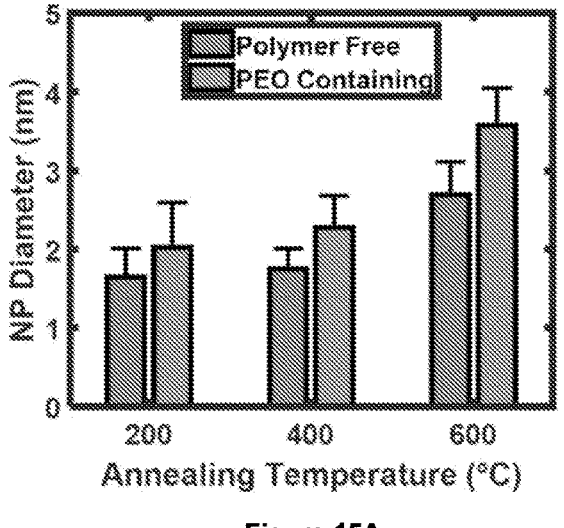

These data show that the majority of the coarsening in
PEO-containing shells occurs at temperatures below the
polymer degradation temperature (400° C.), supporting the
hypothesis that the polymer matrix facilitates coarsening by
promoting diffusion. It was also observed that PEO pro-
motes reduction at a lower temperature, which may accel-
erate the process of nucleating metal atoms. Of the two
coarsening mechanisms (i.e., Ostwald ripening and particle
migration/coalescence), Ostwald ripening tends to dominate at smaller particle sizes immediately after particle nucleation, which may explain the rapid decrease in particles per reactor that was observed early in the annealing process (FIG. 4). Further, based on the classical mean field growth velocity describing particle coarsening, the rate of change of particle size (i.e., the coarsening/growth rate) is linearly proportional to the diffusivity of particle atoms in the surrounding matrix. Thus, it is inferred that increases in the diffusivity at temperatures less than 400° C. leads to higher growth rates and the rapid formation of large single particles (FIG. 4, FIG. 15), before a drop in the growth rate above this temperature (due to both polymer decomposition and the lack of remaining free gold atoms).

Figures 5A, 5B:
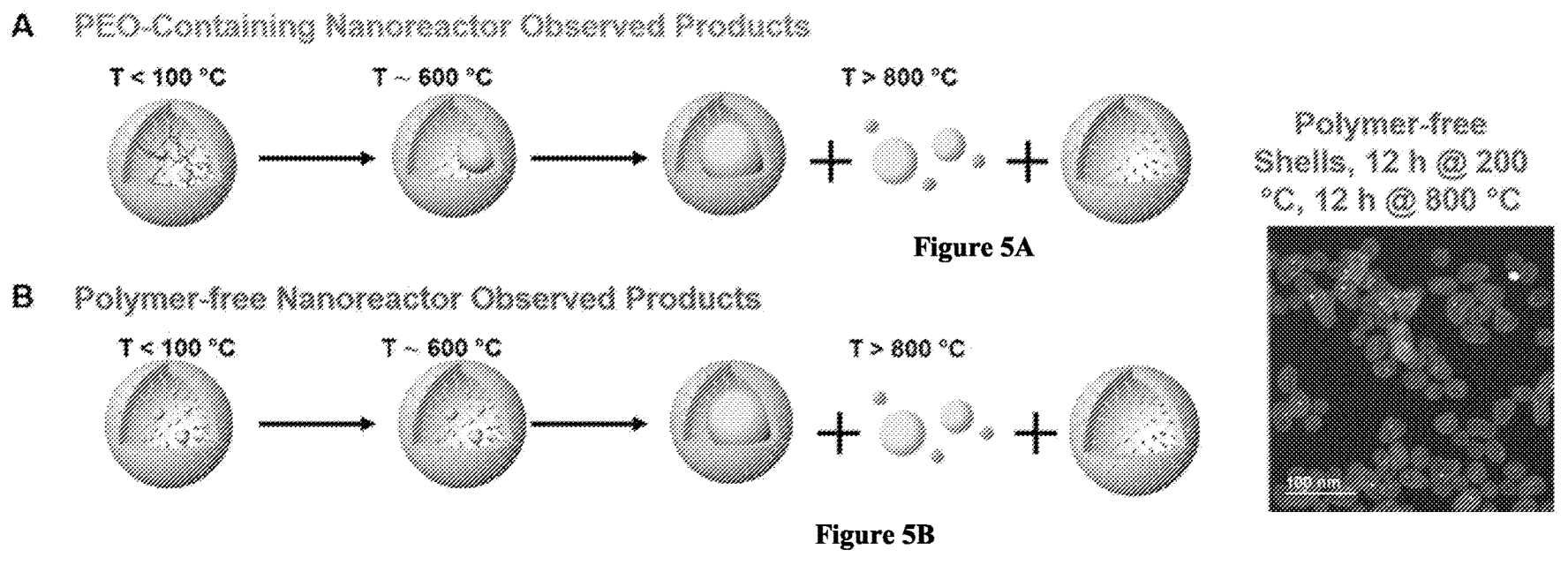
Figure 16A:
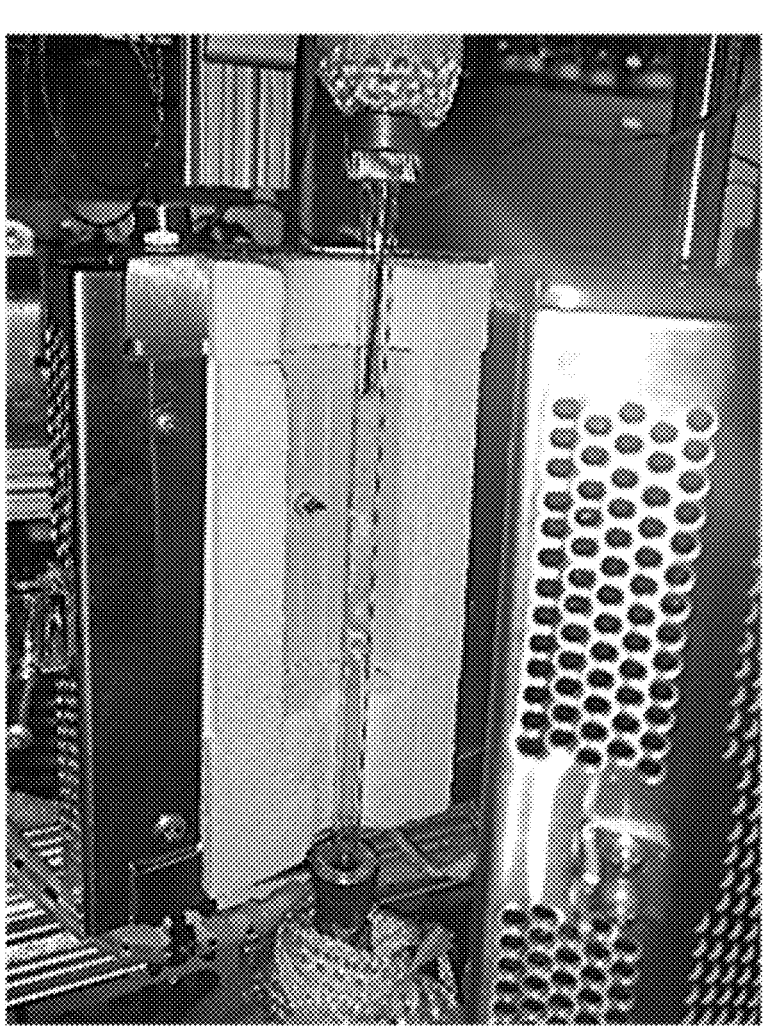
FIG. 16A is an image of an experimental setup for catalytic oxidation of CO in the presence of $O_2$ over the metal particles to confirm that any polymer residue present in the system does not prevent catalytic activity.
Figure 16B:
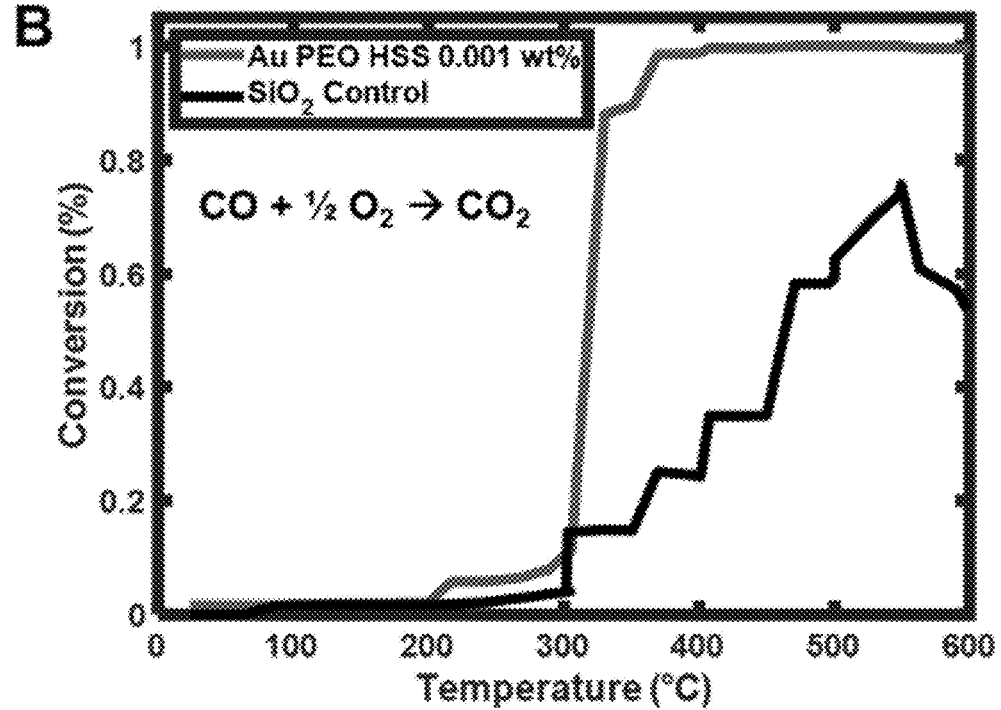
FIG. 16B is a graph showing that directly after reductive annealing, the PEO containing silica shells are active even at low mass loading of 0.001 wt %, with a 50% conversion temperature of T50=310° C., compared to 480° C. for the inert $SiO_2$ control (representing purely thermal oxidation).

With the polymer-free shells, it is exceptionally difficult to produce coarsening conditions that yield a monodisperse particle population; at low and intermediate temperatures (T<750° C.), small freshly nucleated particles form that are not uniform in size, while at high temperatures (T>750° C.), particles escape and potentially enter adjacent silica shells (FIG. 5). In contrast, polymer (specifically, PEO) incorporation results in particles with uniform sizes at intermediate temperatures (600° C.<T<750° C.), where particle escape from the silica shell is also prohibited. There is therefore a large temperature range (T<750° C.) in which these particles can be used, where they remain unaffected by temperature, and do not undergo further coarsening or escape. To finally confirm that the polymer residue does not result in dead catalyst, a test reaction of CO oxidation was also performed (FIG. 16), and the temperature necessary to achieve 50% conversion ($T_{50}$) was significantly lower than that of the control system (310° C. vs. 480° C.), using a low mass-loading (0.001 wt. %). On the basis of this evidence, these polymer-containing silica shells can be defined as nanoreactors, as control over the degree of conversion of the contents is fully exploited and complete confinement is achieved, while leaving the surfaces intact for downstream applications.

EXAMPLES

Polymer-Incorporated Hollow Silica Shell Synthesis. Hollow silica shells based on water-in-oil microemulsions were formed by preparing an aqueous ink mixture consisting of gold salt (HAuCl$_4$×3 H$_2$O, Sigma Aldrich, 99.99%) and aqueous polymer typically in a mass ratio of 2:1 metal to polymer (e.g., 4 mg/mL and 2 mg/mL). The polymer is omitted in the polymer-free systems. The polymers, poly(ethylene oxide) and poly(acrylic acid) (Sigma Aldrich), and poly(ethylene oxide)-block-poly(2-vinyl pyridine) (Polymer Source) had molecular weights of 1.1 k, 2 k, and 1.8 k-b-1 k g/mol, respectively. The oil solution was prepared by mixing 10 g of n-decane (Sigma Aldrich, 99.9%) with 0.6 g of Igepal CO-520 (Sigma Aldrich), and 0.2 g of n-hexanol (Sigma Aldrich, 99.9%). Practically, larger volumes were mixed to minimize error, and then volumes corresponding to 10.8 g of the oil mixture were aliquoted into 20-mL vials and stirred. After stirring for 5 minutes, 70 μL of aqueous ink solution was injected, and the sample was stirred for another 5 mins to form a stable microemulsion. The silanes used were tetraethyl orthosilicate (TEOS, 99%) and (3-amino-propyl)trimethoxysilane (APTMS, Sigma Aldrich, 97%). The APTMS was diluted in ethanol (Sigma Aldrich, 99.5%) in a ratio of 1:7 silane to alcohol by volume (e.g., 100 μL:700 μL). The two silanes—40 μL of TEOS and 8.5 μL of ethanolic APTMS—were then introduced to the microemulsion simultaneously. After 2 hours of stirring at room temperature, 100 μL of ammonia hydroxide (Sigma Aldrich, 28-30%) was added to initiate silane condensation. After three days of stirring, the microemulsion was disrupted with ethanol, and washed twice by centrifugation. The dry solids were then mixed into 15 mL of warm water and stirred at 45° C. for 1.5 hours. Finally, the mixture was isolated by centrifugation and placed in a ceramic combustion boat (Thermo Fisher) for reductive annealing.

Reductive Thermal Annealing. Reductive annealing was performed in a tube furnace (Thermo Fisher) fitted with a quartz tube. The gas was ultra-high purity H$_2$, flowed at 100 sccm. The annealing process proceeds in two steps (FIG. 7A)—a lower temperature step at 200° C. for 10 hours, and then a higher temperature step at 600° C. for 10 hours. The ramp rates were typically 3-5° C./min. For the supplemental ex situ experiments, the annealing process was drastically shortened to simplify comparison with the in-situ experiments, and the higher temperature annealing step was only performed for 1 hour (FIG. 13). This change introduces some error because the time spent ramping and cooling (1-2 h) is approximately as long as the annealing time, and with non-forced/natural convective cooling processes, the total heat transfer applied during ramping and cooling for the high temperature ex situ measurements is likely larger than desired.

Bulk Characterization. X-ray photoelectron spectroscopy (XPS, Thermo Scientific ESCALAB 250XI) experiments were performed on particles within silica shells deposited on flat silicon wafers. A standard XPS workflow was followed, [37] and charge compensation was enabled. The peaks were all shifted using the carbon 1s peak to calibrate the peak position and determine the oxidation state. Thermo Fisher Avantage software was used to identify the different chemical states. X-ray diffraction (XRD, Rigaku Ultima) data was collected using a Cu Ka source and compared to the ICDD's online powder diffraction file, PDF: 01-071-4073. UV-vis (Agilent Cary-60) data were collected using dilute solutions of the unannealed or reduced particles in silica shells. Surface area and pore-size distribution measurements were collected using N$_2$ adsorption and desorption isotherms (Micromeritics, 3Flex) at 77 K. The specific surface area was determined using the Brunauer-Emmett-Teller (BET) model from the N$_2$ sorption data. Pore size distributions were obtained using the Barrett-Joyner-Halenda (BJH) method. Contact angle goniometry (Rame-Hart Instruments) was used to investigate the wetting properties of the dilute metal-polymer mixtures. Thermogravimetric analysis (TA instruments, Discovery) on the polymer inks was conducted in a N$_2$ environment with a 10° C./min ramp rate. Temperature programmed reduction (Altamira, AMI-200) was accomplished in a quartz U-boat with a flow rate of 30 sccm H$_2$ in N$_2$ (10%), and a ramp rate of 10° C./min. The effluent was monitored using a sampling mass spectrometer (Stanford Research Systems, Universal Gas Analyzer MS). Inductively-coupled plasma optical emission spectroscopy (Thermo iCap7600 ICP-OES) was used to quantify the metal loading. The catalytic oxidation was achieved in a packed bed reactor (Altamira, BenchCat 4000) with an inline gas chromatography sampling the effluent (Agilent 7890A GC).

Scanning and Scanning Transmission Electron Microscopy. The nanoparticle-containing silica shells as well as the nanoparticles themselves were characterized by scanning electron microscopy (SEM) (Hitachi SU-8030), using an accelerating voltage of 5 kV, operating current of 20 pA, and working distance of 2 mm. Scanning transmission electron microscopy (STEM) images were taken with either a Hitachi HD-2300 STEM or an aberration-corrected JEOL JEM- ARM 200CF STEM. Both microscopes operate with an acceleration voltage of 200 kV. Energy dispersive X-ray spectra were collected using the ARM 200CF. The La peaks of Au and the Ka peaks of Si and O in the energy-dispersive x-ray spectroscopy (EDS) spectra were used for elemental mapping.

In Situ Reductive Annealing. The in situ gas experiments were carried out using an aberration-corrected JEOL JEM-ARM 200CF S/TEM, using a commercially available gas-delivering TEM holder (Protochips Atmosphere gas system). This microscope was equipped with a cold field emission gun and dual EDS silicon drift detectors. Before assembly, the two wafer-chips used for imaging the samples were cleaned with methanol and acetone before being plasma-cleaned in $O_2$ for 1.5 mins at 30 W to render them hydrophilic. The inner surface of one chip was used to disperse the sample and then it was sandwiched with a second chip, which seals against an elastomeric O-ring. The gas lines were purged using ultra high-purity (UHP) Ar gas in a pump/purge process. The samples were imaged at room temperature, and then a pre-bake process was applied, where $O_2$ was introduced at 0.1 sccm, 760 torr to the holder, and the system was warmed to 80° C. at 1° C./s to purge any adventitious carbon. This process drastically decreases carbon build-up during imaging. The polymers within the silica shells do not degrade in this temperature range (FIG. 7B, 7C). After that step, 10% $H_2$ in 90% Ar process gas was introduced at 0.1 sccm and 760 torr, and heated at 0.45° C./s to each set point temperature (e.g., 100° C., 200° C.) for imaging. Due to challenges with carbon build-up, and e-beam-induced coarsening during continuous monitoring (FIG. 13), the samples were imaged only at set intervals of temperature. After heating to the final temperature, the images were collected outside of the region directly exposed to the e-beam for comparison. STEM imaging convergence angle and high angle annular dark field (HAADF) image collection angle ranges were 27.5 or 20.6 mrad, and 90-370 or 68-280 mrad for the polymer-free and polymer-containing systems, respectively. The emission current was 15 μA, with a constant acquisition time of 20.97 s. At a magnification of 500k, the e-beam dose was therefore approximately 800 e/$Å^2$. Due to carbon build-up in the polymer-containing silica shells as well as to minimize any e-beam induced coarsening, these samples utilized a slightly lower e-beam dose (with a smaller convergence angle and lower image magnification of 300k), resulting in a nominal dose of approximately 120 e/$Å^2$.

Figure 2A:
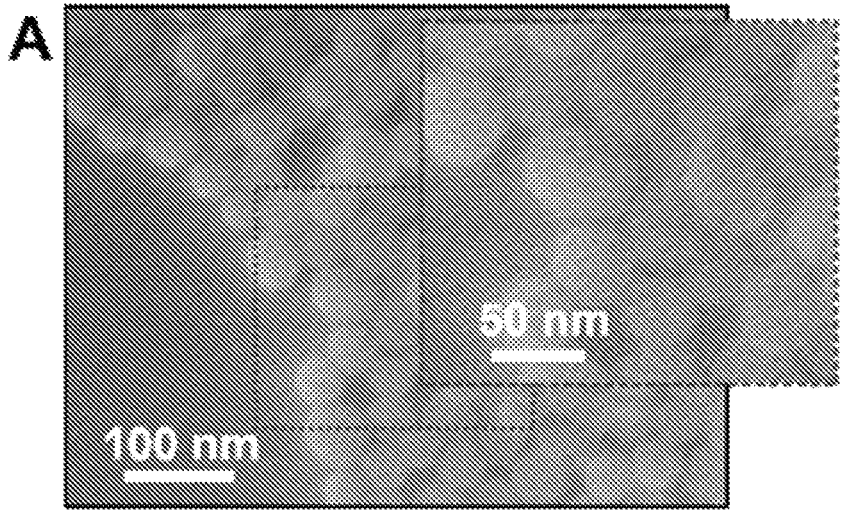
Figure 2B:
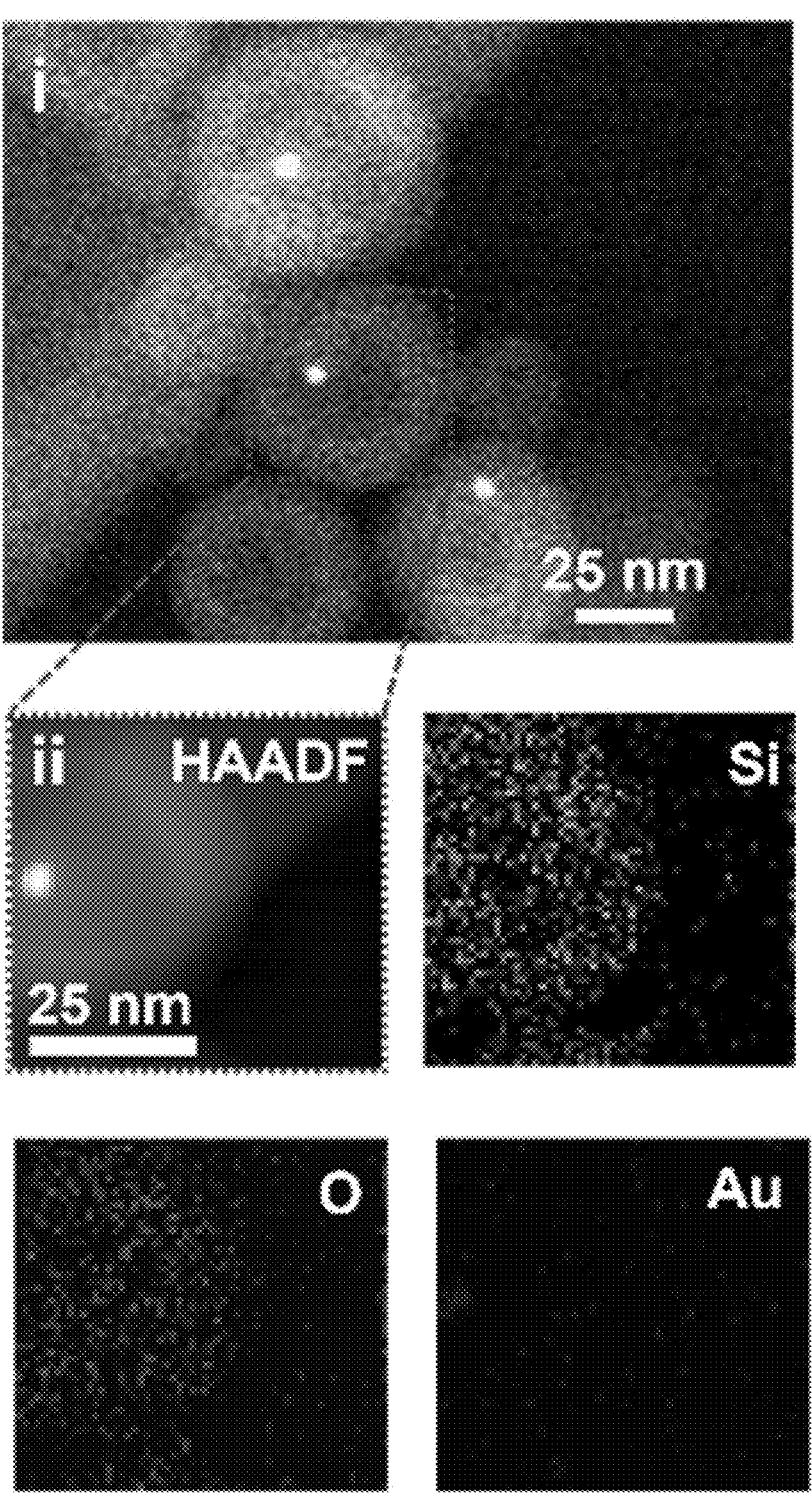
Figure 2C:
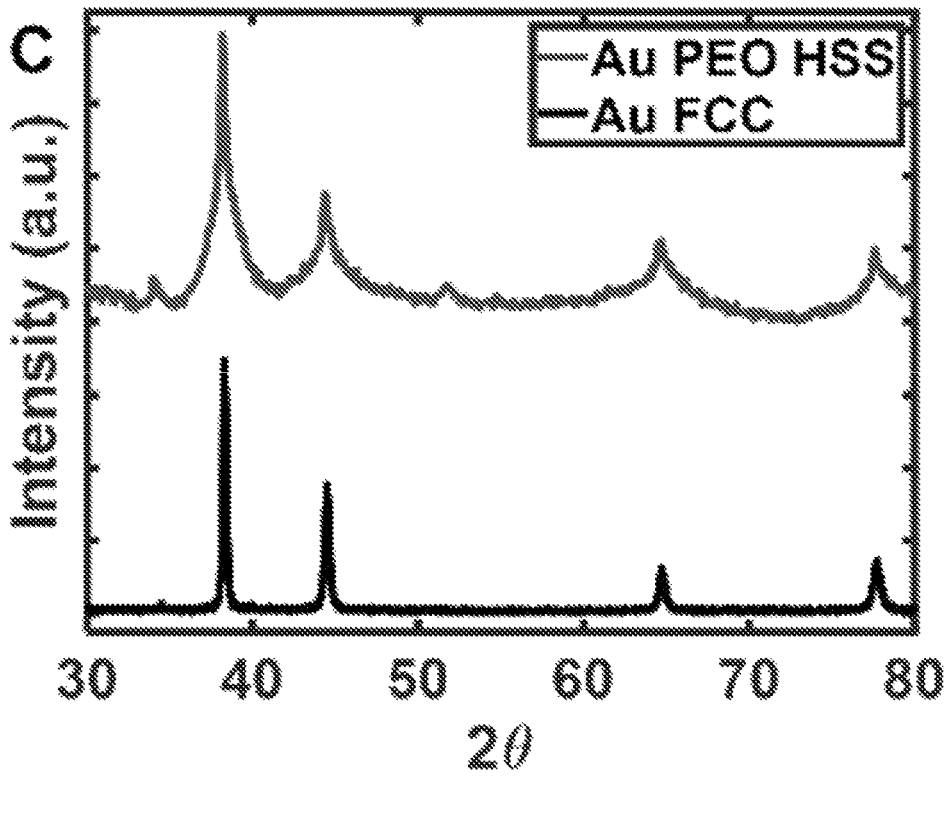
Figure 2D:
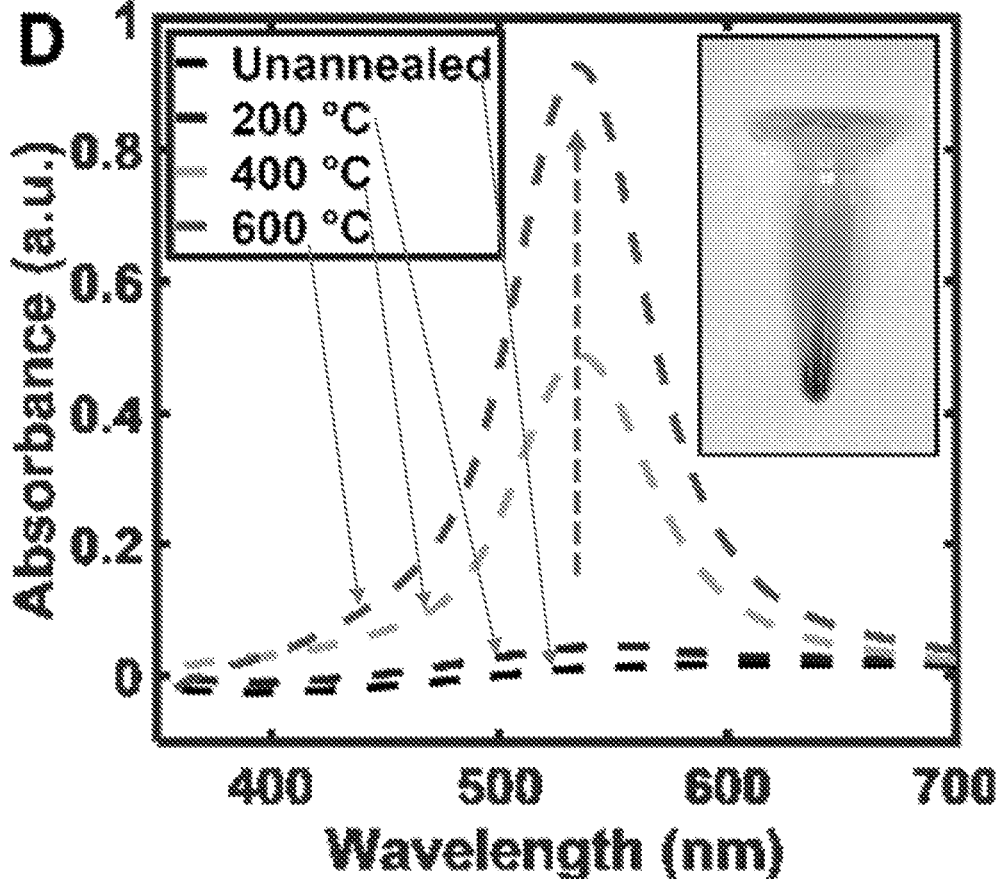

Results. The reaction products were imaged using scanning electron microscopy (SEM) and scanning transmission electron microscopy (STEM). Further, energy-dispersive x-ray spectroscopy (EDS) was used to map the chemical identities of the shell contents. Hollow spherical shells were observed, with diameters (40±6 nm) dictated by the microemulsion templating process (FIG. 2A); the low-contrast region within each shell observable in transmission or high-angle annular dark-field microscopy modes indicates that they are hollow (FIG. 2A, 2B,i.). Higher contrast, smaller diameter (5.7±0.7 nm) spheres were observed within the hollow shells that were comprised of gold metal (FIG. 2B,ii.). The X-ray diffraction pattern of these structures matched that of FCC Au (i.e., powder diffraction files from the International Center for Diffraction Data (ICDD)) (FIG. 2C); the amorphous silica only contributes a broad background to the diffraction pattern. UV-vis spectroscopy also revealed the presence of a plasmon absorption band centered at approximately 540 nm (characteristic of gold particles of this size) that was not present before annealing (FIG. 2D).

Figure 2E:
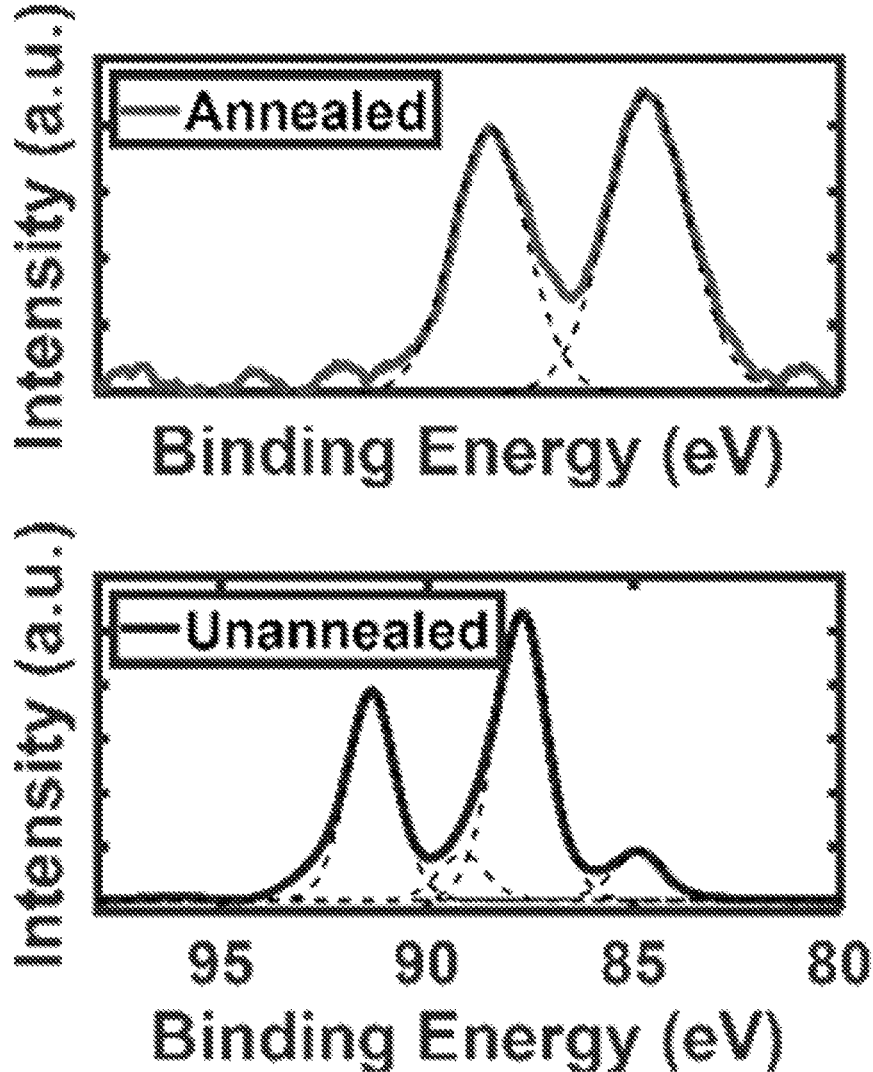
Figure 8A:
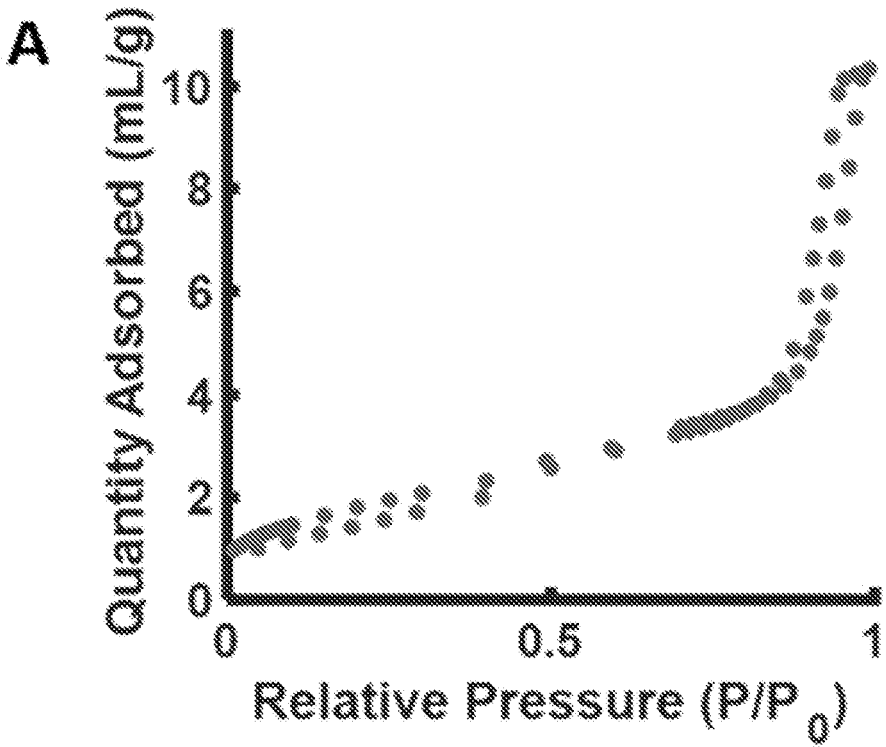
FIG. 8A is a graph showing $N_2$ adsorption isotherm after reductive annealing and synthesis of gold nanoparticles with PEO polymer incorporated within hollow silica shells.
Figure 8B:
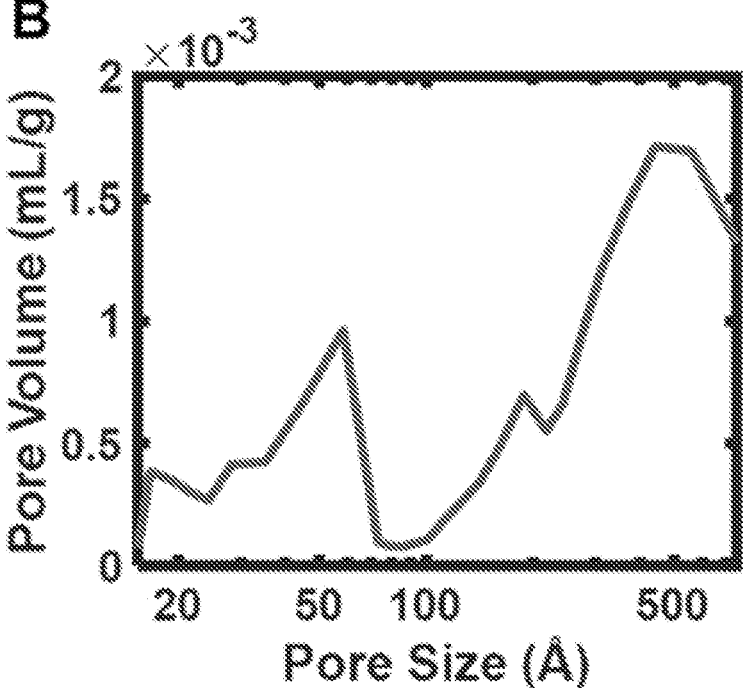
FIG. 8B is a graph showing pore size distribution showing bimodal pore distribution, including small mesopores on the surface of the silica shell, and a larger cavity within the silica shell. Specific surface area using the Brunauer-Emmett-Teller (BET) method: 6.6 $m^2$/g.

Finally, X-ray photoelectron spectroscopy was used to monitor the oxidation state of the gold before and after the reductive annealing steps (FIG. 2E). Before reductive annealing, some quantity of gold salt was in reduced form, perhaps due to photoreduction from the ambient light or impinging X-rays, but the majority of the gold present was in the 3+ oxidation state. After reductive annealing, two peaks corresponding to the spectra from zero-valent Au 4f photoelectrons were observed, indicating that the metal ions were reduced to metallic solid particles. The surface area and porosity were revealed based on $N_2$ adsorption isotherms (FIG. 8); the pore-size distribution was bimodal including smaller mesopores on the surface of the silica shell (d<5 nm), and then a large cavity arising from the hollow silica shell itself (d~40 nm).

Figure 3A:
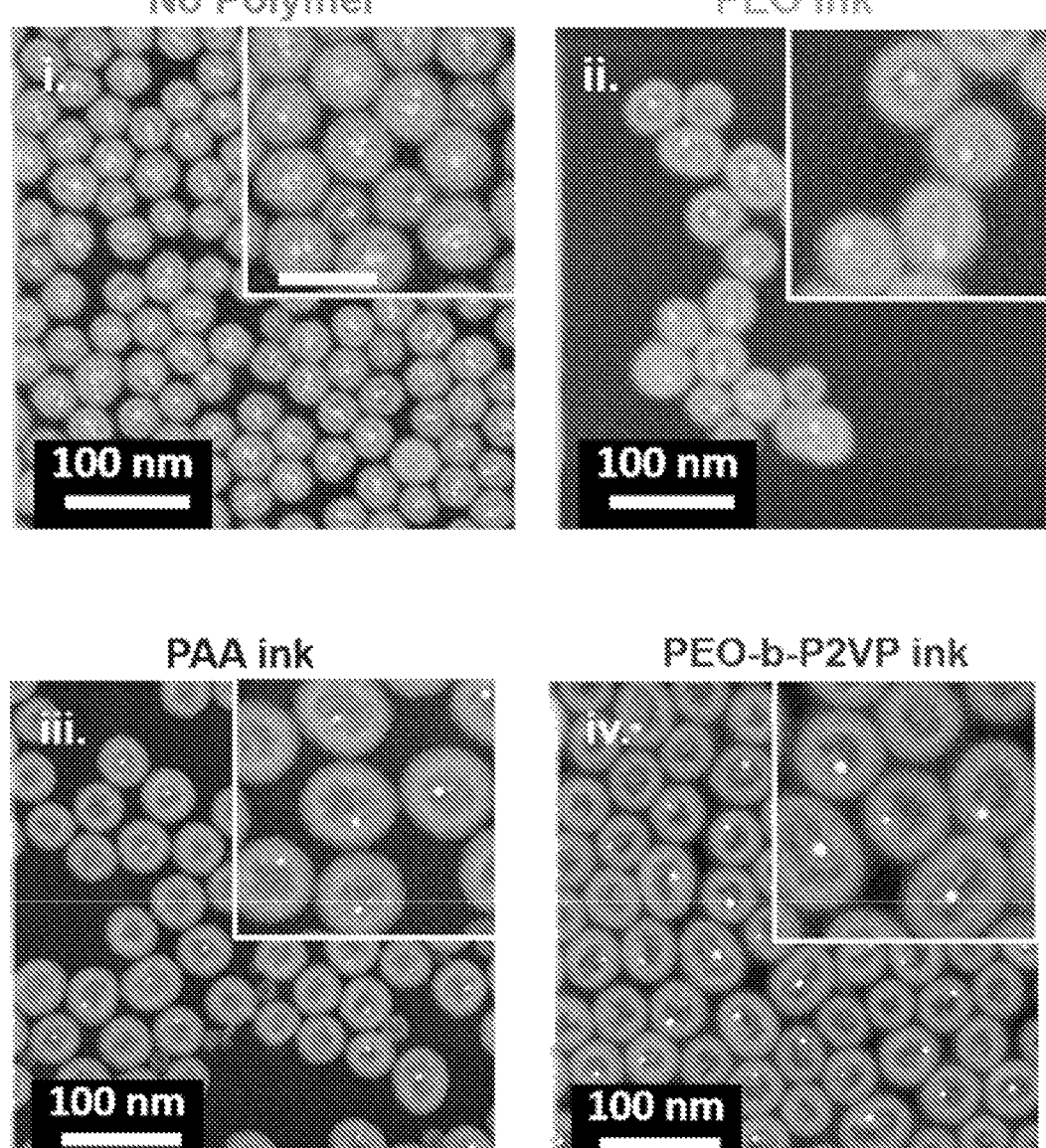
FIGS. 3A to 3C show particles per nanoreactor and particle sizes as a function of presence and type of incorporated polymer, wherein FIG. 3A includes STEM images of the nanoparticles after reductive annealing with i. no polymer incorporated, ii. PEO incorporated, iii. PAA incorporated, and iv. PEO-b-P2VP incorporated. All of the images in the insets were taken at the same magnification, and the scale bar for the inset in i. is 50 nm.
Figure 3B:
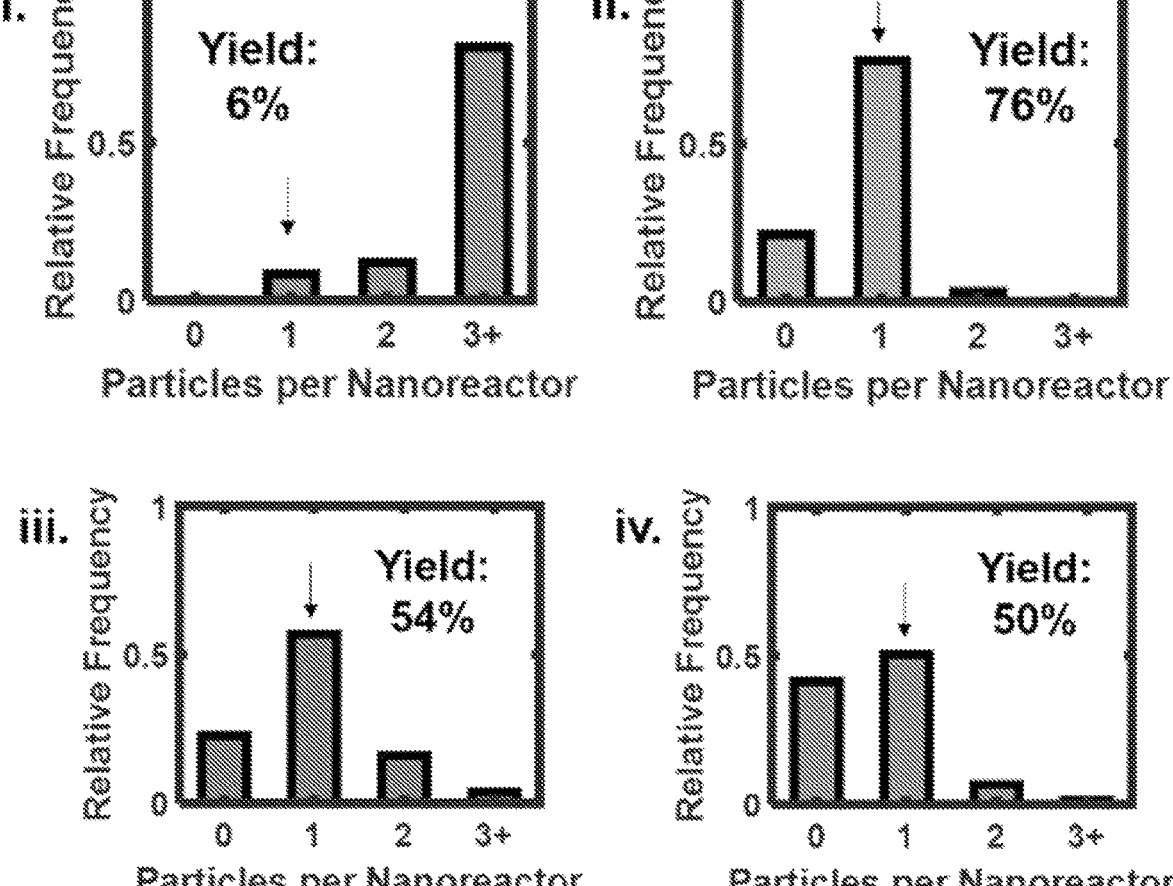
Figure 3C:
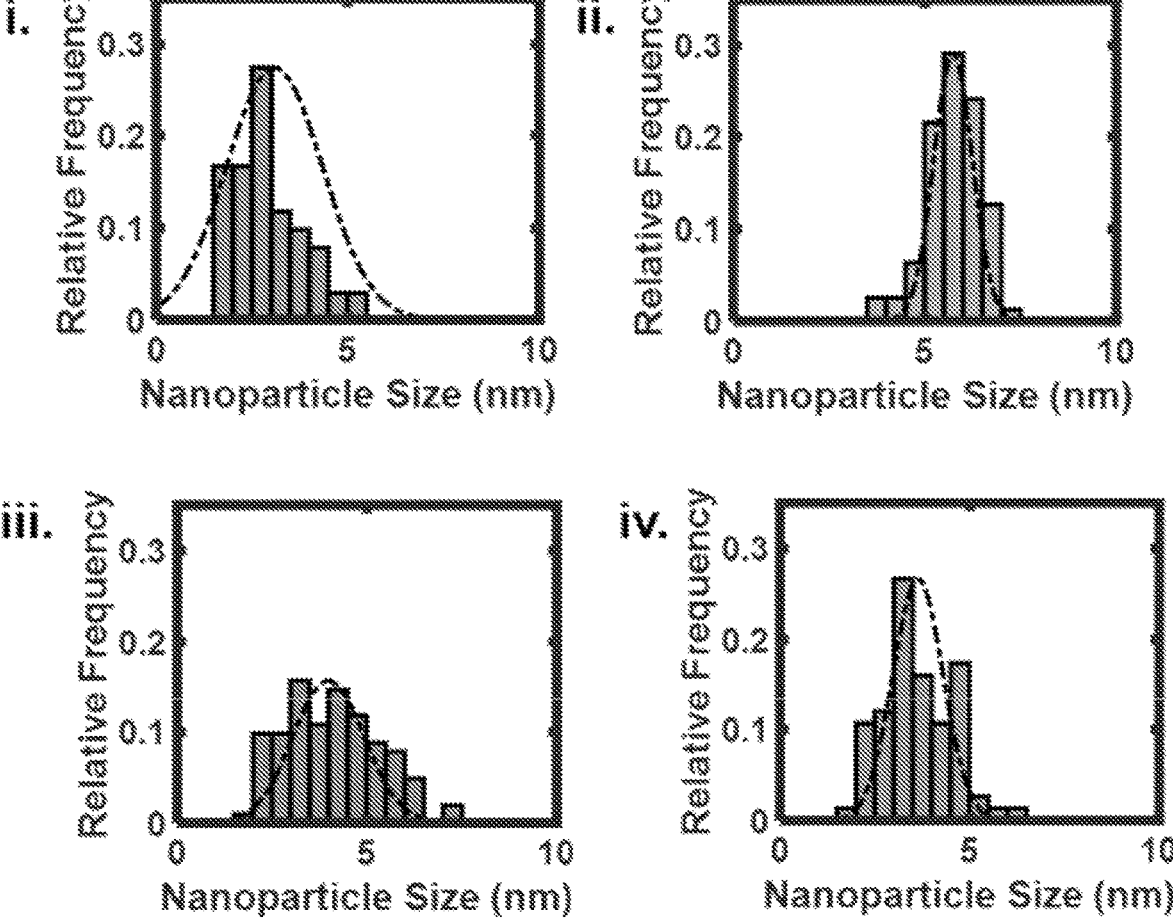

As a control, the same reaction was run with silica shells that did not contain polymer, and the reaction also was run with shells that incorporated PAA or PEO-b-2VP, instead of PEO. These polymers also coordinate or associate with the metal salts, and the block copolymer PEO-b-2VP, in particular, is known to increase the mobility of metal salts and atoms leading to large single nanoparticle formation in the SPBCL system.[29] Qualitatively, a higher yield of individual nanoparticles within each reactor was observed when a polymer was used (FIG. 3A); the polymer-free system yielded a large number of shells with multiple particles, indicating that coarsening was incomplete (FIG. 3B). The highest yield of single particles (76%) was attained when PEO was used. The average particle size also increased when PEO was used, and the particle size distribution decreased (no polymer: 3.1±1.7 nm, PEO: 5.7±0.7 nm), indicating that the polymer-containing silica shell is acting as an effective nanoreactor and driving all trapped precursors into a single particle product (FIG. 3C). The single particle yields and final particle sizes and size distributions for the PAA and PEO-b-P2VP systems (PAA: 54%, 4.0±1.3 and PEO-b-P2VP: 50%, 3.6±0.9 nm) were found to be in between those of the polymer-free and PEO systems.

Figure 10A:
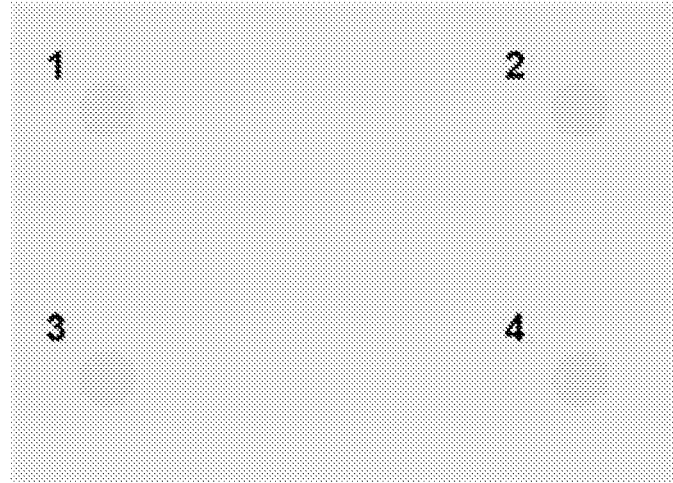
FIG. 10A is a schematic representation of drop-casted precursor on the same wafer to compare how polymer inks effect coarsening.
Figure 11A:
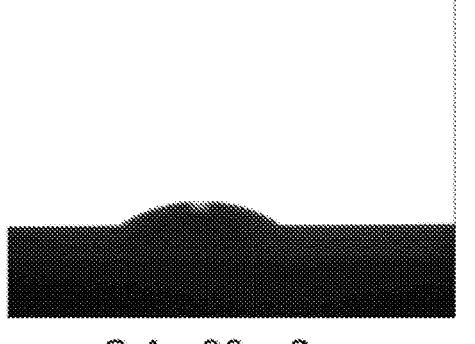
FIGS. 11A to 11D are images showing contact angle goniometry data from gold precursor solutions that are A) polymer-free, B) PEO-containing, C) PAA-containing, and D) PEO-b-P2VP-containing. The similarity in contact angles demonstrate that the polymer incorporation does not significantly change the surface tension.
Figure 11B:
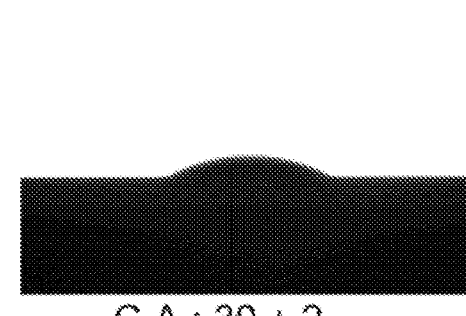
Figure 11C:
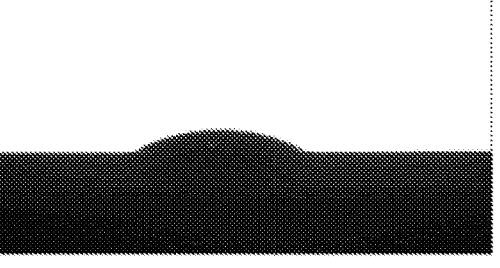
Figure 11D:
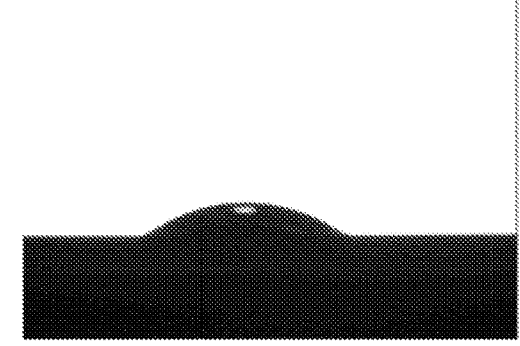
Figure 12A:
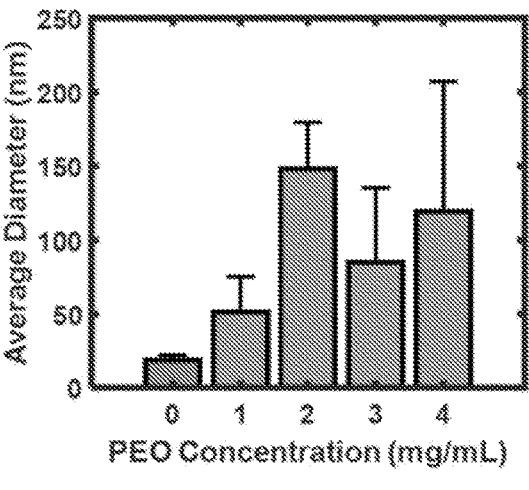
FIGS. 12A to 12D are graphs of nanoparticle average diameter attained via drop-coating ink on Si/$SiO_2$ wafers as a function of concentration and polymer type for A) PEO, B) PAA, and C) PEO-b-P2VP. D) Summary figure showing particle sizes as a function of polymer at 2 mg/mL, the same polymer concentration as was used in the experiments with silica shell nanoreactors.
Figure 12B:
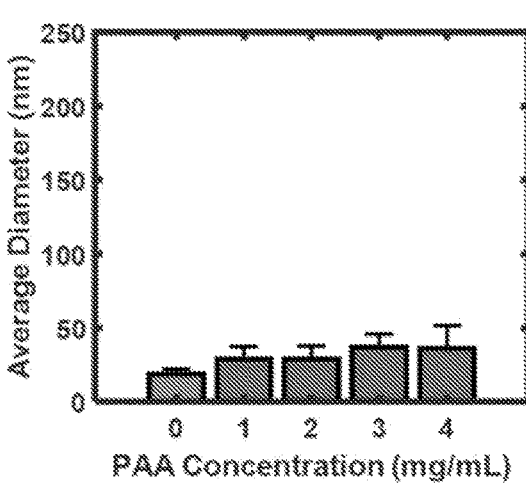
Figure 12C:
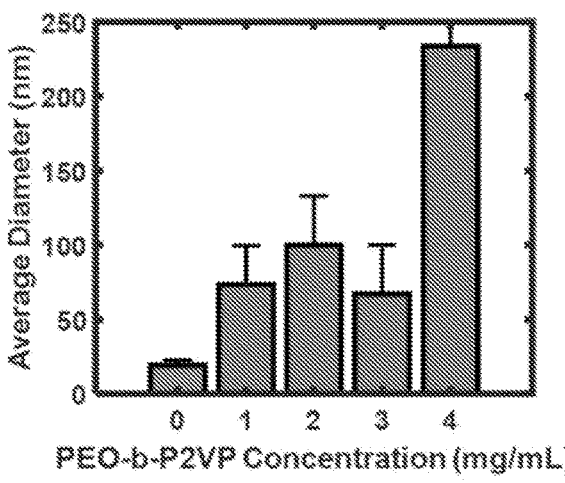
Figure 12D:
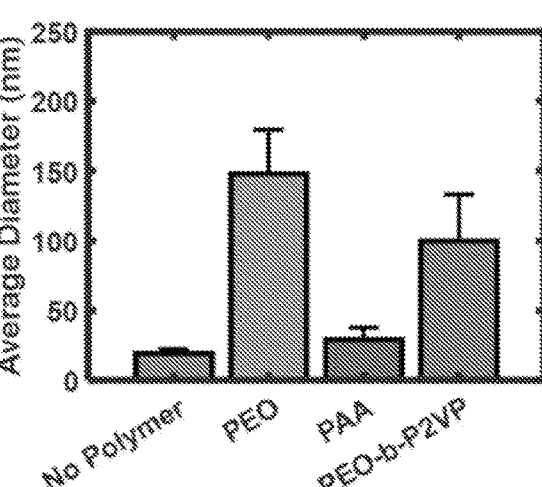

In order to directly investigate the mobility of the metals with the three polymers used, polymer-metal ink mixtures were drop-cast onto untreated silicon wafers and subjected to reductive annealing (FIG. 10). Because the wetting of the inks on the wafers were similar (FIG. 11), it was assumed that the observed differences in coarsening were caused exclusively by differences in diffusion through the dried polymer-matrix. When inks of the same concentrations were subjected to identical annealing conditions as those used for the shell-based reactions, significantly more coarsening was observed for inks containing PEO and PEO-b-P2VP compared to those containing PAA or those not containing polymer (FIG. 12). For example, the gold nanoparticle diameter produced in the no-polymer system was 19±7 nm; it was 150±60 nm in diameter when PEO was used. These results imply that PEO and PEO-b-P2VP facilitate diffusion to a greater extent than PAA, and that more diffusion occurs when polymers are present. This information helps one interpret the low yield of single particles in the presence of PAA (54%). Based on the observed data, the strength of the interaction of the ligand to the metal salt itself is not highly predictive of the degree of coarsening observed in unconfined media. Indeed, the average particle size is not correlated with the spectrochemical series for the repeat units within each polymer; their interaction strengths are comparable and depend on metal ion oxidation state/geometry, but generally decrease in the order: pyridine>ether>acrylate. This observation implies that the diffusion of the reduced metal through the polymer dictates final particle size rather than the interaction of the unreduced metal salt with the polymer.

It is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

It is also to be understood that the terminology used herein is for the purpose of describing particular aspects only and is not intended to be limiting. As used in the specification and in the claims, the term "comprising" can include the aspect of "consisting of." Unless defined otherwise, all technical and scientific terms used herein have the same meaning as commonly understood by one of ordinary skill in the art to which the disclosed compositions and methods belong. In this specification and in the claims which follow, reference will be made to a number of terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The use of the terms "a," "an," "the," and similar referents in the context of the disclosure herein (especially in the context of the claims) are to be construed to cover both the singular and the plural, unless otherwise indicated. Recitation of ranges of values herein merely are intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended to better illustrate the disclosure herein and is not a limitation on the scope of the disclosure herein unless otherwise indicated. No language in the specification should be construed as indicating any non-claimed element as essential to the practice of the disclosure herein.

REFERENCES

U.S. Patent Application Publication No. 2015/0210868.

(1) Gandhi, A. C.; Pradeep, R.; Yeh, Y.-C.; Li, T.-Y.; Wang, C.-Y.; Hayakawa, Y.; Wu, S. Y. Understanding the Magnetic Memory Effect in Fe-Doped NiO Nanoparticles for the Development of Spintronic Devices. *ACS Appl. Nano Mater.* 2018, 2,278-290.

(2) Al-Bustami, H.; Koplovitz, G.; Primc, D.; Yochelis, S.; Capua, E.; Porath, D.; Naaman, R.; Paltiel, Y. Single Nanoparticle Magnetic Spin Memristor. Small 2018, 14, 1801249.

(3) Nagesetti, A.; Rodzinski, A.; Stimphil, E.; Stewart, T.; Khanal, C.; Wang, P.; Guduru, R.; Liang, P.; Agoulnik, I.; Horstmyer, J.; Khizroev, S. Multiferroic Coreshell Magnetoelectric Nanoparticles as NMR Sensitive Nanoprobes for Cancer Cell Detection. *Sci. Reports* 2017 71 2017, 7,1-9.

(4) Wang, L.; Kafshgari, M. H.; Meunier, M. Optical Properties and Applications of Plasmonic-Metal Nanoparticles. *Adv. Funct. Mater.* 2020, 30, 2005400.

(5) Yu-xi Zhang; Yu-hua Wang. Nonlinear Optical Properties of Metal Nanoparticles: A Review. *RSC Adv.* 2017, 7,45129-45144.

(6) Liu, L.; Corma, A. Metal Catalysts for Heterogeneous Catalysis: From Single Atoms to Nanoclusters and Nanoparticles. *Chem. Rev.* 2018, 118, 4981-5079.

(7) Aslam, U.; Rao, V. G.; Chavez, S.; Linic, S. Catalytic Conversion of Solar to Chemical Energy on Plasmonic Metal Nanostructures. *Nat. Catal.* 2018 19 2018, 1, 656-665.

(8) Gao, D.; Aran-Ais, R. M.; Jeon, H. S.; Roldan Cuenya, B. Rational Catalyst and Electrolyte Design for CO2 Electroreduction towards Multicarbon Products. *Nat. Catal.* 2019 23 2019, 2,198-210.

(9) Shan, S.; Li, J.; Maswadeh, Y.; O'Brien, C.; Kareem, H.; Tran, D. T.; Lee, I. C.; Wu, Z. P.; Wang, S.; Yan, S.; Cronk, H.; Mott, D.; Yang, L.; Luo, J.; Petkov, V.; Zhong, C. J. Surface Oxygenation of Multicomponent Nanoparticles toward Active and Stable Oxidation Catalysts. *Nat. Commun.* 2020, 11, 1-9.

(10) He, Y.; Liu, J.-C.; Luo, L.; Wang, Y.-G.; Zhu, J.; Du, Y.; Li, J.; Mao, S. X.; Wang, C. Size-Dependent Dynamic Structures of Supported Gold Nanoparticles in CO Oxidation Reaction Condition. *Proc. Natl. Acad. Sci.* U.S.A. 2018, 115, 7700-7705.

(11) Jin, M.; Zhang, H.; Xie, Z.; Xia, Y. Palladium Concave Nanocubes with High-Index Facets and Their Enhanced Catalytic Properties. *Angew. Chemie Int. Ed.* 2011, 50, 7850-7854.

(12) Li, T.; Yao, Y.; Huang, Z.; Xie, P.; Liu, Z.; Yang, M.; Gao, J.; Zeng, K.; Brozena, A. H.; Pastel, G.; Jiao, M.; Dong, Q.; Dai, J.; Li, S.; Zong, H.; Chi, M.; Luo, J.; Mo, Y.; Wang, G.; et al. Denary Oxide Nanoparticles as Highly Stable Catalysts for Methane Combustion. *Nat. Catal.* 2021, 4, 62-70.

(13) Glasscott, M. W.; Pendergast, A. D.; Goines, S.; Bishop, A. R.; Hoang, A. T.; Renault, C.; Dick, J. E. Electrosynthesis of High-Entropy Metallic Glass Nanoparticles for Designer, Multi-Functional Electrocatalysis. *Nat. Commun.* 2019, 10.

(14) Zhang, W.; Zhang, Z.-P.; Zhang, X.-E.; Li, F. Reaction inside a Viral Protein Nanocage: Mineralization on a Nanoparticle Seed after Encapsulation via Self-Assembly. *Nano Res.* 2017, 10, 3285-3294.

(15) Lohmüller, T.; Aydin, D.; Schwieder, M.; Morhard, C.; Louban, I.; Pacholski, C.; Spatz, J. P. Nanopatterning by Block Copolymer Micelle Nanolithography and Bioinspired Applications. *Biointerphases* 2011, 6, MR1—MR12.

(16) Pang, X.; Zhao, L.; Han, W.; Xin, X.; Lin, Z. A General and Robust Strategy for the Synthesis of Nearly Monodisperse Colloidal Nanocrystals. *Nat. Nanotechnol.* 2013, 8, 426-431.

(17) Chen, Y.; Yang, D.; Yoon, Y. J.; Pang, X.; Wang, Z.; Jung, J.; He, Y.; Ham, Y. W.; He, M.; Zhang, S.; Zhang, G.; Lin, Z. Hairy Uniform Permanently Ligated Hollow Nanoparticles with Precise Dimension Control and Tunable Optical Properties. *J. Am. Chem. Soc.* 2017, 139, 12956-12967.

(18) Tsukamoto, T.; Kambe, T.; Nakao, A.; lmaoka, T.; Yamamoto, K. Atom-Hybridization for Synthesis of Polymetallic Clusters. *Nat. Commun.* 2018, 9,3873.

(19) Tsukamoto, T.; Kuzume, A.; Nagasaka, M.; Kambe, T.; Yamamoto, K. Quantum Materials Exploration by Sequential Screening Technique of Heteroatomicity. *J. Am. Chem. Soc.* 2020, jacs.0c06653.

(20) Chen, P.-C.; Liu, M.; Du, J. S.; Meckes, B.; Wang, S.; Lin, H.; Dravid, V. P.; Wolverton, C.; Mirkin, C. A. Interface and Heterostructure Design in Polyelemental Nanoparticles. *Science* 2019, 363, 959-964.

(21) Du, J. S.; Chen, P.-C.; Meckes, B.; Xie, Z.; Zhu, J.; Liu, Y.; Dravid, V. P.; Mirkin, C. A. The Structural Fate of Individual Multicomponent Metal-Oxide Nanoparticles in Polymer Nanoreactors. *Angew. Chemie Int. Ed.* 2017, 56, 7625-7629.

(22) Thanh, N. T. K.; Maclean, N.; Mahiddine, S. Mechanisms of Nucleation and Growth of Nanoparticles in Solution. *Chem. Rev.* 2014, 114, 7610-7630.

(23) Swisher, J. H.; Jibril, L.; Petrosko, S. H.; Mirkin, C. A. Nanoreactors for Particle Synthesis. *Nat. Rev. Mater.* 2022.

(24) Chai, J.; Huo, F.; Zheng, Z.; Giam, L. R.; Shim, W.; Mirkin, C. A. Scanning Probe Block Copolymer Lithography. *Proc. Natl. Acad. Sci.* 2010, 107, 20202-20206.

(25) Chen, P.-C.; Liu, X.; Hedrick, J. L.; Xie, Z.; Wang, S.; Lin, Q.-Y.; Hersam, M. C.; Dravid, V. P.; Mirkin, C. A. Polyelemental Nanoparticle Libraries. *Science* 2016, 352, 1565-1569.

(26) Huang, L.; Lin, H.; Zheng, C. Y.; Kluender, E. J.; Golnabi, R.; Shen, B.; Mirkin, C. A. Multimetallic High-Index Faceted Heterostructured Nanoparticles. *J. Am. Chem. Soc.* 2020, 142, 4570-4575.

(27) Kluender, E. J.; Hedrick, J. L.; Brown, K. A.; Rao, R.; Meckes, B.; Du, J. S.; Moreau, L. M.; Maruyama, B.; Mirkin, C. A. Catalyst Discovery through Megalibraries of Nanomaterials. *Proc. Natl. Acad. Sci. U.S.A.* 2019, 116, 40-45.

(28) Huang, L.; Chen, P.-C.; Liu, M.; Fu, X.; Gordiichuk, P.; Yu, Y.; Wolverton, C.; Kang, Y.; Mirkin, C. A. Catalyst Design by Scanning Probe Block Copolymer Lithography. *Proc. Natl. Acad. Sci. U.S.A.* 2018, 115, 3764-3769.

(29) Chen, P. C.; Liu, G.; Zhou, Y.; Brown, K. A.; Chernyak, N.; Hedrick, J. L.; He, S.; Xie, Z.; Lin, Q. Y.; Dravid, V. P.; O'Neill-Slawecki, S. A.; Mirkin, C. A. Tip-Directed Synthesis of Multimetallic Nanoparticles. *J. Am. Chem. Soc.* 2015, 137, 9167-9173.

(30) Wu, S.-H.; Tseng, C.-T.; Lin, Y.-S.; Lin, C.-H.; Hung, Y.; Mou, C.-Y. Catalytic Nano-Rattle of Au@hollow Silica: Towards a Poison-Resistant Nanocatalyst. *J. Mater. Chem.* 2011, 21, 789-794.

(31) Hansen, T. W.; Delariva, A. T.; Challa, S. R.; Datye, A. K. Sintering of Catalytic Nanoparticles: Particle Migration or Ostwald Ripening? *Acc. Chem. Res.* 2013, 46, 1720-1730.

(32) Jiang, H. L.; Umegaki, T.; Akita, T.; Zhang, X. B.; Haruta, M.; Xu, Q. Bimetallic Au—Ni Nanoparticles Embedded in SiO$_2$ Nanospheres: Synergetic Catalysis in Hydrolytic Dehydrogenation of Ammonia Borane. *Chem.—A Eur. J.* 2010, 16, 3132-3137.

(33) Li, X.; Zheng, W.; Chen, B.; Wang, L.; He, G. Rapidly Constructing Multiple AuPt Nanoalloy Yolk@Shell Hollow Particles in Ordered Mesoporous Silica Microspheres for Highly Efficient Catalysis. *ACS Sustain. Chem. Eng.* 2016, 4, 2780-2788.

(34) Baldizzone, C.; Mezzavilla, S.; Carvalho, H. W. P.; Meier, J. C.; Schuppert, A. K.; Heggen, M.; Galeano, C.; Grunwaldt, J.-D.; Schüth, F.; Mayrhofer, K. J. J. Confined-Space Alloying of Nanoparticles for the Synthesis of Efficient PtNi Fuel-Cell Catalysts. *Angew. Chemie Int. Ed.* 2014, 53,14250-14254.

(35) Yao, Q.; Lu, Z. H.; Wang, Y.; Chen, X.; Feng, G. Synergetic Catalysis of Non-Noble Bimetallic Cu—Co Nanoparticles Embedded in SiO$_2$ Nanospheres in Hydrolytic Dehydrogenation of Ammonia Borane. *J. Phys. Chem. C* 2015, 119, 14167-14174.

(36) Jiang, H.-L.; Umegaki, T.; Akita, T.; Zhang, X.-B.; Haruta, M.; Xu, Q. Bimetallic Au—Ni Nanoparticles Embedded in SiO2 Nanospheres: Synergetic Catalysis in Hydrolytic Dehydrogenation of Ammonia Borane. *Chem.—A Eur. J.* 2010, 16, 3132-3137.

(37) Moulder, J. F.; Chastain, J. Handbook of X-Ray Photoelectron Spectroscopy: A Reference Book of Standard Spectra for Identification and Interpretation of XPS Data; Physical Electronics Division, Perkin-Elmer Corp, 1992.

(38) Shaik, F.; Zhang, W.; Niu, W. A Generalized Method for the Synthesis of Ligand-Free M@SiO2 (M=Ag, Au, Pd, Pt) Yolk-Shell Nanoparticles. *Langmuir* 2017, 33,3281-3286.

(39) Lin, C. H.; Chang, J. H.; Yeh, Y. Q.; Wu, S. H.; Liu, Y. H.; Mou, C. Y. Formation of Hollow Silica Nanospheres by Reverse Microemulsion. *Nanoscale* 2015, 7,9614-9626.

(40) Liu, G.; Eichelsdoerfer, D. J.; Rasin, B.; Zhou, Y.; Brown, K. A.; Liao, X.; Mirkin, C. A. Delineating the Pathways for the Site-Directed Synthesis of Individual Nanoparticles on Surfaces. *Proc. Natl. Acad. Sci. U.S.A.* 2013, 110, 887-891.

(41) Jibril, L.; Chen, P.-C.; Hu, J.; Odom, T. W.; Mirkin, C. A. Massively Parallel Nanoparticle Synthesis in Anisotropic Nanoreactors. *ACS Nano* 2019, 13, 12408-12414.

(42) Xue, C.; Shi, X.; Tian, Y.; Zheng, X.; Hu, G. Diffusion of Nanoparticles with Activated Hopping in Crowded Polymer Solutions. *Nano Lett.* 2020, 20, 3895-3904.

(43) Link, S.; EI-Sayed, M. A. Spectral Properties and Relaxation Dynamics of Surface Plasmon Electronic Oscillations in Gold and Silver Nanodots and Nanorods. *J. Phys. Chem. B* 1999, 103, 8410-8426.

(44) Cros, A. Charging Effects in X-Ray Photoelectron Spectroscopy. *J. Electron Spectros. Relat. Phenomena* 1992, 59, 1-14.

(45) Steed, J. W. First- and Second-Sphere Coordination Chemistry of Alkali Metal Crown Ether Complexes. *Coord. Chem. Rev.* 2001, 215, 171-221.

(46) Yoo, C.; Dodge, H. M.; Miller, A. J. M. Cation-Controlled Catalysis with Crown Ether-Containing Transition Metal Complexes. *Chem. Commun.* 2019, 55,5047-5059.

(47) Knetsch, D.; Groeneveld, W. L. Alcohols as Ligands: Part IV. Complexes of Ethylene Glycol with Some Metal (II) Sulfates and Nitrates. *Recl. des Tray. Chim. des Pays-Bas* 1973, 92,855-864.

(48) Tuzovskaya, I.; Bogdanchikova, N.; Simakov, A.; Gurin, V.; Pestryakov, A.; Avalos, M.; Farias, M. H. Structure and Electronic States of Gold Species in Mordenites. *Chem. Phys.* 2007, 338, 23-32.

(49) Khullar, P.; Mahal, A.; Singh, V.; Banipal, T. S.; Kaur, G.; Bakshi, M. S. How PEO-PPO-PEO Triblock Polymer Micelles Control the Synthesis of Gold Nanoparticles: Temperature and Hydrophobic Effects. *Langmuir* 2010, 26, 11363-11371.

(50) Shou, Q.; Guo, C.; Yang, L.; Jia, L.; Liu, C.; Liu, H. Effect of PH on the Single-Step Synthesis of Gold Nanoparticles Using PEO-PPO-PEO Triblock Copolymers in Aqueous Media. *J. Colloid Interface Sci.* 2011, 363, 481-489.

(51) Wexler, R. M.; Tsai, M. C.; Friend, C. M.; Muetterties, E. L. Pyridine Coordination Chemistry of Nickel and Platinum Surfaces. *J. Am. Chem. Soc.* 2002, 104, 2034-2036.

(52) Shephard, G. S.; Thornton, D. A. Crystal Field Aspects of Vibrational Spectra: VII. Derivation of a Spectrochemical Series of Ligands from Infrared Spectra. *J. Mol. Struct.* 1976, 34, 83-91.

(53) Uflyand, I. E.; Kokoreva, I. V.; Starikov, A. G.; Sheinker, V. N.; Pomogailo, A. D. Polymers Containing Metal Chelate Units. IV. Immobilised Complexes of Transition Metal Acrylates with 2,2'-Dipyridyl and 1,10-Phenanthroline. *React. Polym.* 1989, 11, 221-226.

(54) Mrudula, M. S.; Tiwari, N.; Jha, S. N.; Bhattacharyya, D.; Nair, M. R. G. Structural Studies on Transition Metal Ion Complexes of Polyethylene Oxide-Natural Rubber Block Copolymers. *J. Polym. Res.* 2019 268 2019, 26, 1-16.

(55) Roach, J. D.; Bondaruk, M. M.; Al-Abdulghani, A.; Shahrori, Z.; Roach, J. D.; Bondaruk, M. M.; Al-Abdulghani, A.; Shahrori, Z. Counterion Binding in Aqueous Solutions of Poly(Vinylpyridines) as Assessed by Potentiometric Titration. *Adv. Mater. Phys. Chem.* 2016, 6, 249-261.

(56) Laia, C. A. T.; Brown, W.; Almgren, M.; Costa, S. M. B. Light Scattering Study of Water-in-Oil AOT Microemulsions with Poly(Oxy)Ethylene. *Langmuir* 2000, 16, 465-470.

(57) Behafarid, F.; Roldan Cuenya, B. Towards the Understanding of Sintering Phenomena at the Nanoscale: Geometric and Environmental Effects. *Top. Catal.* 2013, 56, 1542-1559.

(58) Dai, Y.; Lu, P.; Cao, Z.; Campbell, C. T.; Xia, Y. The Physical Chemistry and Materials Science behind Sinter-Resistant Catalysts. *Chem. Soc. Rev.* 2018, 47, 4314-4331.

(59) Hoyt, J. J. *Phase Transformations*; McMaster Innovation Press: Hamilton, Canada, 2011; Vol. 1.

What is claimed is:

1. A method of forming nanostructures, comprising:

admixing an aqueous solution into an oil-phase to thereby form an emulsion of droplets of the aqueous solution in the oil phase, the aqueous solution comprising a nanostructure precursor and a polymer;

adding a silane precursor and catalyst to the emulsion under conditions sufficient to form a silica shell around each of the droplets to thereby form nanoreactors, each comprised of a hollow silica shell surrounding a core comprising the aqueous solution;

annealing the nanoreactors at a first temperature below the decomposition temperature of the polymer to aggregate the nanostructure precursor within each of the nanoreactors; and annealing the nanoreactors at a second temperature above the decomposition temperature of the polymer to convert the aggregated nanostructure precursor to the nanostructure and decompose the polymer and thereby form the nanostructure within the hollow silica shell.

2. The method of claim 1, wherein annealing at the first and/or second temperature is performed in a reductive atmosphere using a flow of $H_2$ gas.

3. The method of claim 1, wherein the oil-phase further comprises one or more surfactants.

4. The method of claim 3, wherein the one or more surfactants comprise one or more of n-decane, n-hexanol, pentanol, n-butanol, tert-butyl alcohol, tert-amyl alcohol, sodium dodecylbenzene sulfonate (SDBS), and cetyl trimethyl ammonium bromide (CTAB).

5. The method of claim 1, wherein the silane precursor comprises one or more of tetraethyl orthosilicate (TEOS), (3-aminopropyl) trimethoxysilane (APTMS), tetramethyl orthosilicate, aminopropyl) triethoxysilane (APTES), 3-(2-Aminoethylamino)propyldimethoxymethylsilane, n-(6-aminohexyl)aminopropyltrimethoxysilane, 95%, n-methylaminopropyltrimethoxysilane, n-butylaminopropyltrimethoxysilane, n-(2-aminoethyl)-3-aminopropyltriethoxysilane.

6. The method of claim 1, wherein the nanostructure precursor comprises a metal salt.

7. The method of claim 6, wherein the metal salt is one or more of $HAuCl_4$, $AgNO_3$, $H_2PtCl_6$, $Na_2PdCl_4$, $Fe(NO_3)_3$, $Co(NO_3)_2$, $Ni(NO_3)_2$, $Cu(NO_3)_2$, $Na_2PtCl_4$, $CdCl_2$, $ZnCl_2$, $FeCl_3$, and $NiCl_2$.

8. The method of claim 1, wherein the polymer comprises one or more of polyethylene oxide, polyethylene oxide-b-poly (2vinyl pyridine) (PEO-b-P2VP), polyacrylic acid (PAA), Poly(vinyl alcohol), polyethyleneimine, poly(sodium 4-styrenesulfonate), and Poly(diallyldimethylammonium chloride).

9. The method of claim 1, wherein the first temperature is in a range of 70° C. to 400° C.

10. The method of claim 1, wherein the second temperature is in a range of 400° C. to 800° C.

11. The method of claim 1, further comprising isolating the nanoreactors before annealing.

12. The method of claim 11, further comprising washing the isolated nanoreactors before annealing.

13. The method of claim 1, wherein the oil-phase comprises a solvent comprising one or more of cyclohexane, n-hexane, n-heptane, n-octane, n-nonane, n-decane, n-undecane, and n-dodecane.

14. The method of claim 1, wherein the method results in a yield of single nanostructures within the nanoreactors of at least about 70%.

15. The method of claim 1, wherein the resulting nanostructures have an average particle size of at least about 5 nm.

16. The method of claim 1, wherein the catalyst is one or more of ammonium hydroxide, potassium hydroxide, and sodium hydroxide.

17. The method of claim 1, further comprising etching the hollow silica shell with a base to remove the nanostructure from the hollow silica shell.

* * * * *